(12) United States Patent
Ikeda et al.

(10) Patent No.: US 9,296,253 B2
(45) Date of Patent: Mar. 29, 2016

(54) WATER TRANSFER PRINTING METHOD, TRANSFER FILM FOR WATER TRANSFER PRINTING, INK FOR TRANSFER FILM, AND WATER TRANSFER PRINTED PRODUCT

(75) Inventors: Wataru Ikeda, Minato-ku (JP); Akiko Tomiki, Minato-ku (JP)

(73) Assignee: TAICA CORPORATION, Tokyo (JP)

( * ) Notice: Subject to any disclaimer, the term of this patent is extended or adjusted under 35 U.S.C. 154(b) by 60 days.

(21) Appl. No.: 13/978,769

(22) PCT Filed: Jan. 13, 2012

(86) PCT No.: PCT/JP2012/050567
§ 371 (c)(1),
(2), (4) Date: Jul. 26, 2013

(87) PCT Pub. No.: WO2012/099007
PCT Pub. Date: Jul. 26, 2012

(65) Prior Publication Data
US 2013/0291746 A1   Nov. 7, 2013

(30) Foreign Application Priority Data

Jan. 20, 2011   (JP) .................. 2011-009786

(51) Int. Cl.
| | |
|---|---|
| B32B 37/02 | (2006.01) |
| B32B 37/14 | (2006.01) |
| B32B 38/14 | (2006.01) |
| B29C 65/14 | (2006.01) |
| B29C 65/48 | (2006.01) |
| B44C 1/175 | (2006.01) |
| B29C 35/08 | (2006.01) |

(52) U.S. Cl.
CPC ........... *B44C 1/1758* (2013.01); *B29C 65/1406* (2013.01); *B29C 65/4845* (2013.01); *B44C 1/175* (2013.01); *B29C 65/14* (2013.01); *B29C 2035/0827* (2013.01)

(58) Field of Classification Search
CPC ...... B44C 1/175; B44C 1/1758; B29C 65/14; B29C 65/1406; B29C 2035/0827; B29C 65/4845
USPC .......................................... 156/273.3, 275.5
See application file for complete search history.

(56) References Cited

U.S. PATENT DOCUMENTS

| | | | |
|---|---|---|---|
| 7,141,134 B2 * | 11/2006 | Cho | ............................. 156/235 |
| 7,951,255 B2 | 5/2011 | Ikeda et al. | |
| 8,178,187 B2 | 5/2012 | Ikeda et al. | |
| 9,090,118 B2 * | 7/2015 | Ikeda | |
| 2007/0042163 A1 * | 2/2007 | Ariga et al. | ................ 428/195.1 |

(Continued)

FOREIGN PATENT DOCUMENTS

| | | | |
|---|---|---|---|
| GB | 1515325 A | * | 6/1978 |
| JP | 2009234187 A | | 10/2009 |

(Continued)

*Primary Examiner* — Sonya Mazumdar
(74) *Attorney, Agent, or Firm* — Pearne & Gordon LLP

(57) ABSTRACT

The object of the invention is to be able to adjust gloss or impart gloss variation not only for a decoration layer of dark color such as black ink, but also for a decoration layer of light color other than black and the gloss of the ink printed portion is adjusted or the gloss variation where a high gloss pattern part and a low gloss pattern part are adjacent to each other is imparted according to the ratio of blend of ultraviolet ray absorbent and/or ultraviolet ray shielding agent contained in an ink of a print pattern of a transfer film.

8 Claims, 7 Drawing Sheets

(56) References Cited

U.S. PATENT DOCUMENTS

2007/0051458 A1 3/2007 Ikeda et al.
2007/0154685 A1 7/2007 Ikeda et al.
2011/0189445 A1* 8/2011 Takeuchi et al. ............ 428/195.1
2012/0111951 A1* 5/2012 Ikeda et al. .................... 235/491

FOREIGN PATENT DOCUMENTS

| | | |
|---|---|---|
| JP | 2010235131 A | 10/2010 |
| WO | 2004108434 A1 | 12/2004 |
| WO | 2005077676 A1 | 8/2005 |

* cited by examiner (A)

(B)

(C)

(D)

(E)

(F)

WATER TRANSFER PRINTING METHOD, TRANSFER FILM FOR WATER TRANSFER PRINTING, INK FOR TRANSFER FILM, AND WATER TRANSFER PRINTED PRODUCT

TECHNICAL FIELD

The invention relates to a water pressure transfer method in which after an adhesion of a dried print pattern of a water pressure transfer film to be transferred by water pressure onto a surface of an article to be decorated is reproduced (restored), the print pattern is transferred by water pressure onto the article and a water pressure transfer article having a decoration layer formed by the method.

BACKGROUND OF THE INVENTION

In order to decorate a complicated three-dimensional surface of an article having such a surface, a water pressure transfer film having a print pattern of non-water-solubility on a water-soluble film is floated on a water in a transfer tub, after making wet the water-soluble film of the transfer film, an article (an object to be pattern-transferred) is immersed into the water in the transfer tub while contacting the transfer film and the print pattern of the transfer film is transferred on a surface of the article using the water pressure generated when the article is immersed into water to form a decoration layer.

In general, since the water pressure transfer film has the print pattern printed and dried on the water-soluble film and is stored while wound in a form of roll form, the ink of the print pattern is in a dry state where adhesion is lost. Thus, the print pattern of the water pressure transfer film is required to restore the same state as the wet state just after the print pattern (the state having the adhesion) is printed. The applicant have proposed an activating agent composed of non-solvent type ultraviolet ray hardening resin composite in place of a conventionally use solvent-type activating agent composed of thinner or the like and a water pressure transfer method using such a non-solvent type activating agent has been carried out on a large scale now.

With such an activating agent of non-solvent type ultraviolet ray hardening resin composite used, this ultraviolet ray hardening resin composite permeates the print pattern to thereby restore the wet state of the print pattern and in addition thereto the ultraviolet ray hardening resin composite permeating the print pattern intermingled in the ink is hardened within the print pattern by the ultraviolet ray irradiation carried out after the water pressure transfer of the print pattern. This is the same state as the one in which the ultraviolet ray hardening characteristic is imparted to the print pattern itself, whereby the mechanical and chemical surface protection characteristics such as abrasion resistance, solvent resistance, chemical resistance, weather resistance, etc. are imparted to the decoration layer formed by the print e pattern on the article. This causes a surface protection topcoat to be not required and prevents the decoration layer from being removed out of the surface of the article because the ultraviolet ray hardening resin composite intermingled within the decoration layer is adhered to the surface of the article with high strength whereby an extremely preferable water pressure transfer can be performed (see the Patent Document 1).

The applicant has also developed an art in which a cubic feeling is imparted to the decoration layer by changing a glossiness of the adjacent printed portions of the decoration layer in such a water pressure transfer method (see Patent Document 2).

This art adjusts the glossiness of the decoration layer according to the oil absorption of the ink pigments of the print pattern or the concentration of the ink and imparts the gloss changing characteristics where a high gloss pattern part and a low gloss pattern part are adjacent to each other by using this principle as disclosed by Patent Document 2. In this art, the quantity of the ultraviolet ray hardening resin composite permeating the ink changes according to the oil absorption (the amount of absorption of ultraviolet ray hardening resin) of the ink or the concentration of the ink whereby the degree of hardening shrinkage of the resin in the ink changes when hardened by ultraviolet ray to thereby change a fine concavo-convex state of the resin to form a gloss variation.

However, since this art adjusts the amount of contraction by the ultraviolet ray hardening of the resin in the ink according to the oil absorption of the ink pigments or the concentration of the ink and therefore adjusts the glossiness thereof, it may be suitably applicable to the decoration layer of comparatively deep and dark color having mainly black or brown used in the pattern such as usual wood-grain pattern, but may not be applicable to the decoration layer of comparatively thin and bright color having yellow or red mainly used in the pattern such as light wood-grain pattern used often recently or including red, blue, yellow and white used in other patterns, which means the decoration layer of color ink other than black ink because the decoration layer of such light color has the matting degree smaller than that of black ink and therefore the scope of gloss adjustment is narrowed, which makes the adjustment of gloss difficult. Therefore, if this conventional art would be applied to the decoration layer of thin and bright color, it will not be able to make gloss adjustment (matting adjustment) having the level equivalent to that of the decoration layer of comparatively deep and dark color having black or brown mainly used.

PRIOR ART LITERATURES

[Patent Document 1] WO 2004/108434
[Patent Document 2] WO2005/77676

SUMMARY OF THE INVENTION

Problem(s) to be Solved by Invention

First problem to be solved by the invention is to provide a water pressure transfer method adapted to be easily able to adjust gloss not only for a decoration layer of color containing black ink, but also a decoration layer of color mainly including bright color ink (white ink included) other than black ink.

Second problem to be solved by the invention is to provide a water pressure transfer method adapted to easily impart gloss variation characteristic of high gloss pattern part and second low pattern part adjacent to each other not only for a decoration layer of color containing black ink, but also a decoration layer of color mainly including bright color ink (white ink included) other than black ink.

Third problem to be solved by the invention is to provide a transfer film for water pressure transfer adapted to be easily able to impart the gloss suitably adjusted not only for a decoration layer of color ink containing black ink, but also a decoration layer of color mainly including bright color ink (white ink included) other than black ink and also adapted to easily impart gloss variation characteristic of high gloss pattern part and second low pattern part adjacent to each other for the ink printed portion.

Fourth problem to be solved by the invention is to provide an ink used for a transfer film for water pressure transfer adapted to be easily able to impart the gloss suitably adjusted not only for a decoration layer of color ink containing black ink, but also a decoration layer of color mainly including bright color ink (white ink included) other than black ink and also adapted to easily impart gloss variation characteristic of high gloss pattern part and low gloss pattern part adjacent to each other for the ink printed portion.

Fifth problem to be solved by the invention is to provide a water pressure transfer article adapted to be easily able to impart the gloss suitably adjusted not only for a decoration layer of color containing black ink, but also a decoration layer of color mainly including bright color ink (white ink included) other than black ink and also adapted to easily impart gloss variation characteristic of high gloss pattern part and low gloss pattern part adjacent to each other for the ink printed portion.

Means to Solve the Problems

Viewpoint of the Invention

As a result of the applicant's further having studied the method for obtaining the matting effect by irradiating ultraviolet ray onto the print pattern having the ultraviolet ray hardening resin composite permeated to thereby form partial fine unevenness on the print pattern as disclosed in Patent Document 2, the applicant discovered that not only the oil absorption of ink pigments of the print pattern and the concentration of the ink, but also the ultraviolet ray permeability of the print pattern having the ultraviolet ray hardening resin composite permeated deeply participate in the formation of fine unevenness for generating the matting and the invention is based on such a principle in which the glossiness of the decoration layer is adjusted according to the ultraviolet ray permeability based on the discovery.

Means to Solve the First Problem

Means to solve the first problem of the invention is to provide a water pressure transfer method comprising the steps of applying an activating agent comprising an ultraviolet ray hardening resin composite containing a photo-polymerization monomer, a photo-polymerization oligomer and a photo-polymerization initiator on a print pattern of a water pressure transfer film having said print pattern dried on a water-soluble film to thereby recover an adhesion of said print pattern by an activating component of said ultraviolet ray hardening resin composite whereby said print pattern is transferred onto a surface of an article under water pressure and also to thereby permeate said ultraviolet ray hardening resin composite into the whole area of said print pattern whereby there is produced an integral layer in which an ink of said print pattern and said ultraviolet ray hardening resin composite are intermingled with each other and hardening said ultraviolet ray hardening resin composite within said print pattern of said integral layer by ultraviolet ray to thereby form a decoration layer having a ink printed portion of predetermined gloss, said method characterized in that the gloss of said ink printed portion is adjusted by changing the ultraviolet ray permeability of said ink printed portion of said decoration layer according to a blend ratio of an ultraviolet ray absorbent and/or an ultraviolet ray shielding agent contained in said ink.

Means to Solve the Second Problem

Means to solve the second problem of the invention is to provide a water pressure transfer method comprising the steps of applying an activating agent comprising an ultraviolet ray hardening resin composite containing a photo-polymerization monomer, a photo-polymerization oligomer and a photo-polymerization initiator on a print pattern of a water pressure transfer film having said print pattern dried on a water-soluble film to thereby recover an adhesion of said print pattern by an activating component of said ultraviolet ray hardening resin composite whereby said print pattern is transferred onto a surface of an article under water pressure and also to thereby permeate said ultraviolet ray hardening resin composite into the whole area of said print pattern whereby there is produced an integral layer in which an ink of said print pattern and said ultraviolet ray hardening resin composite are intermingled with each other and hardening said ultraviolet ray hardening resin composite within said print pattern of said integral layer by ultraviolet ray to thereby form a decoration layer and also to impart to said ink printed portion a gloss variation characteristic having a high gloss pattern part and a low gloss pattern portion adjacent to each other, said method characterized in that said gloss variation characteristic having said high and low pattern parts adjacent to each other is imparted by changing the ultraviolet ray permeability of said ink printed portion of said decoration layer according to a blend ratio of an ultraviolet ray absorbent and/or an ultraviolet ray interrupting agent contained in said ink.

In the means to solve the first and second problems of the invention, said step of hardening by ultraviolet ray is carried out by two irradiation steps including a step of preliminarily irradiating the ultraviolet ray which are penetrated only into an area near a surface of said print pattern made wet by permeation of said ultraviolet ray hardening resin composite to thereby form a fine surface height variation part by contraction of an ink in a surface of the ink printed portion of said print pattern made wet and a step of thereafter originally irradiating ultraviolet ray which are penetrated through the whole thickness of said decoration layer to thereby completely harden the total thickness of said print pattern made wet while said surface height variation is maintained.

In this two-step irradiation process, the ultraviolet ray for said preliminary irradiation are the low permeation ultraviolet ray of 200 nm or more and less than 320 nm and the preliminary irradiation of said ultraviolet ray is preferably carried out under the condition where peak intensity (Ip)[mW/cm$^2$] and integral of light (E) [mJ/cm$^2$]) meet the following formula 1.

$$60E^{-1.4} \leq Ip \leq 5765E^{-1.85} \qquad (1)$$

wherein E is >0 and Ip is >0

In particular, the preliminary irradiation is preferably carried out under the conditions satisfying that the peak intensity (Ip) is 0.5 [mW/cm$^2$] or more and 6 [mW/cm$^2$] or less and integral of light (E) is 5 [mJ/cm$^2$] or more and 120 [mJ/cm$^2$] or less.

Meantime, in the two-step irradiation process, the ultraviolet ray for the original irradiation is the high permeation ultraviolet ray of 320 nm or more and less than 390 nm and the original irradiation of the aforementioned ultraviolet ray is preferably carried out under the conditions satisfying that the peak intensity (Ip$_1$) is 200 [mW/cm$^2$] or more and 400 [mW/cm$^2$] or less and integral of light (E$_1$) is 1000 [mJ/cm$^2$] or more and 4000 [mJ/cm$^2$] or less.

The blend ratio (ratio occupied in the ink) of the ultraviolet ray absorbent (what makes permeability of the ultraviolet ray low) used in the means to solve the first and second problems is preferably 0.1 to 40 weight %. The ultraviolet ray absorbent may be especially effectively of benzophenone group and the blend ratio (ratio occupied in ink) is preferably 0.1 to 30 weight %.

The blend ratio (ratio occupied in ink) of the ultraviolet ray shielding agent (which heightens the dispersion of the ultraviolet ray) used in means to solve the first and second problems is preferably 0.1 to 30 weight %. The especially effective ultraviolet shielding agent is particulate titanium oxide. The particulate titanium oxide able to be used may be either of rutile type, anatase type and brookite type, but the rutile type titanium oxide is most preferred because the titanium oxide of rutile type tends to most easily obtain an ultraviolet ray shielding effect. The diameter of particle of the particulate titanium oxide may be appropriately set within the range where the ink after added has no faults such as cloudiness, but in consideration that in general, the shape of particle of the particulate titanium oxide is board-like or longitudinal, both of the maximum and minimum diameters of the particle may be preferably less than 1 micrometer, more preferably 5 to 200 nm and most preferably 10 to 100 nm. Furthermore, the particulate titanium oxide having surface treatment performed with polysiloxane, etc. may be used if necessary in order to improve the dispersibility etc. of the particulate titanium oxide into ink.

Means to Solve the Third Problem

Means to solve the third problem of the invention is to provide a water pressure transfer film used for a water pressure transfer method comprising the steps of applying an activating agent comprising an ultraviolet ray hardening resin composite containing a photo-polymerization monomer, a photo-polymerization oligomer and a photo-polymerization initiator on a print pattern of a water pressure transfer film having said print pattern dried on a water-soluble film to thereby recover an adhesion of said print pattern by an activating component of said ultraviolet ray hardening resin composite whereby said print pattern is transferred onto a surface of an article under water pressure and also to thereby permeate said ultraviolet ray hardening resin composite into the whole area of said print pattern whereby there is produced an integral layer in which an ink of said print pattern and said ultraviolet ray hardening resin composite are intermingled with each other and hardening said ultraviolet ray hardening resin composite within said print pattern of said integral layer by ultraviolet ray to thereby form a decoration layer and to also impart to said ink printed portion a gloss variation characteristic having a high gloss pattern part and a low gloss pattern portion adjacent to each other, characterized in that said print pattern is formed by being printed with ink having an ultraviolet ray absorbent and/or an ultraviolet ray shielding agent blended in at least a portion corresponding to an uppermost layer on the side of irradiation of ultraviolet ray of said decoration layer to be formed after transfer where the matting intend to be obtained by ultraviolet ray hardening.

Means to Solve the Fourth Problem

Means to solve the fourth problem of the invention is to provide an ink used in a water pressure transfer film for a water pressure transfer method comprising the steps of applying an activating agent comprising an ultraviolet ray hardening resin composite containing a photo-polymerization monomer, a photo-polymerization oligomer and a photo-polymerization initiator on a print pattern of a water pressure transfer film having said print pattern dried on a water-soluble film to thereby recover an adhesion of said print pattern by an activating component of said ultraviolet ray hardening resin composite whereby said print pattern is transferred onto a surface of an article under water pressure and also to thereby permeate said ultraviolet ray hardening resin composite into the whole area of said print pattern whereby there is produced an integral layer in which an ink of said print pattern and said ultraviolet ray hardening resin composite are intermingled with each other and hardening said ultraviolet ray hardening resin composite within said print pattern of said integral layer by ultraviolet ray to thereby form a decoration layer and also to impart to said ink printed portion a gloss variation characteristic having a high gloss pattern part and a low gloss pattern portion adjacent to each other, said ink characterized by having an ultraviolet ray absorbent and/or an ultraviolet ray shielding agent blended in at least a portion corresponding to an uppermost layer on the side of irradiation of ultraviolet ray of said decoration layer to be formed after transfer where the matting intend to be obtained by ultraviolet ray hardening.

Means to Solve Fifth Problem

Means to solve the fifth problem of the invention is to provide a water pressure transfer article having a decoration layer formed by means to solve said first and second means.

Effect of the Invention

According to the invention, since the ultraviolet ray absorbent and/or the ultraviolet ray shielding agent are blended in the ink of the print pattern of the water pressure transfer film and the transparency or permeability of the ultraviolet ray into ink having the ultraviolet ray hardening resin composite intermingled therewith is adjusted according to the blend ratio of the ultraviolet ray absorbent and/or the ultraviolet ray shielding agent to thereby adjust the gloss of the ink printed portion of the decoration layer or to impart the gloss variation characteristic of the ink printed portion of the decoration layer where the high and low gloss pattern parts adjacent to each other, there may be accomplished the adjustment of the gloss and the impartation of the gloss variation not only for the decoration layer mainly of dark color such as black ink, which is carried out by the prior art in which there is varied the contraction agree by hardening of the ink having the ultraviolet ray hardening resin composite intermingled therewith, but also for the decoration layer of color mainly including bright color ink other than the color mainly containing black and therefore the invention can be applied to the decoration of color of wide range.

Especially, with hardening by ultraviolet ray of the ultraviolet ray hardening resin composite carried out by two steps including the step of preliminarily irradiating the ultraviolet ray which are penetrated only into an area near the surface of the print pattern to thereby form the fine surface height variation part by contraction of the ink and the step of thereafter originally irradiating ultraviolet ray which are penetrated through the whole thickness of the decoration layer to thereby completely harden the total thickness of the print pattern while the surface height variation is maintained, the preliminary irradiation of the ultraviolet ray that is the initial permeability of the ultraviolet ray effectively contributes to the formation of the fine unevenness of the surface of the decoration layer and the fine unevenness on the surface of the decoration layer is effectively adjusted together with the blend ratio of the ultraviolet ray absorbent and/or the ultraviolet ray shielding agent blended in the ink whereby the decoration layer can have the desired proper gloss and gloss variation characteristic and therefore the invention can be suitably applied for the gloss and the gloss variation characteristic of the light color decoration layer.

FORMS OF EMBODIMENT OF THE INVENTION

Figure 1:
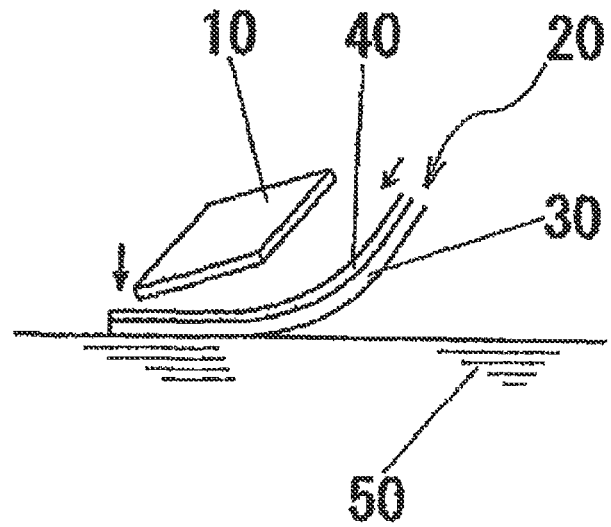
FIG. 1 is a schematic diagram of a water pressure transfer carried out by a method of the invention.

Describing forms of embodiment of the invention with reference to the Drawings. FIG. 1 illustrates a water pressure transfer method to which the invention is applicable. This water pressure transfer method is a method in which a transfer film 20 comprising a water soluble film (carrier film) 30 having a print pattern 40 applied thereon is supplied and floated on a water 50 within a transfer tub with the print pattern 40 directed upside and an article 10 to be pattern-transferred thereto under water pressure is forced underwater through the transfer film 20 to thereby perform the water pressure transfer.

The water soluble film 30 is formed of water soluble material having a main ingredient of polyvinyl alcohol, for example, which gets wet and is softened by absorbing water. This water soluble film 30 is softened when it contacts the water within the transfer tub, turned around and engages the article to be decorated to thereby facilitate the water pressure transfer. The print pattern 40 may be previously applied on the water soluble film 30 by gravure printing and so on in case of general water pressure transfer and is in the state of dryness and solidification where the adhesion is completely lost before the water pressure transfer in order to store the transfer film in a roll-wound state. The print pattern 40 may include a plain (non-pattern) print layer other than the pattern which is meant strictly.

Figure 2:
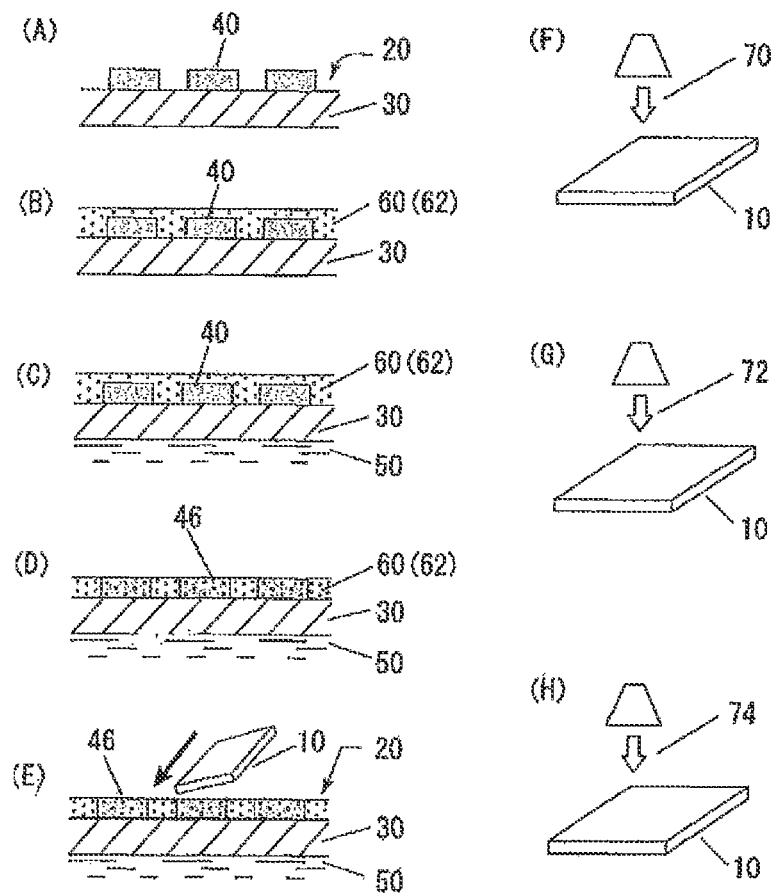
FIG. 2 schematically illustrates each step of the method according to the first form of the invention where water pressure transfer is carried out on an article.

The water pressure transfer method to which the invention is applicable is carried out by applying an activating agent 60 having a main ingredient of ultraviolet ray hardening resin composite 62 on the print pattern 40 of the transfer film 20 (see FIG. 2B) before the water pressure transfer (see FIG. 2A) to thereby restore (reproduce) the adhesion of the print pattern 40 by the non-solvent type activating component in the ultraviolet ray hardening resin composite and also permeate and absorb the ultraviolet ray hardening resin composite 62 into the whole (the whole area and the whole thickness) of the print pattern 40 so as to intermingle the ultraviolet ray hardening resin composite with the print pattern 40 (see FIG. 2C).

In this manner, the ink composite of the print pattern 40 and the ultraviolet ray hardening resin composite 62 which is applied on the print pattern 40 and permeated into the print pattern 40 are mixed whereby the ultraviolet hardening resin composite intermingled print pattern (integral layer) 46 is formed (see FIG. 2D).

Thus, after the transfer film 20 having the adhesion recovered by the ultraviolet ray hardening resin composite 62 and the ultraviolet ray hardening resin composite intermingled print pattern 46 formed by the ultraviolet ray hardening resin composite 62 intermingled with the whole print pattern 40 is transferred under water pressure onto the article 10 (see FIG. 2E), the ultraviolet ray 70 is irradiated on the article 10 (see FIG. 2F) whereby the ultraviolet ray hardening resin composite in the ultraviolet ray hardening resin composite intermingled print pattern 46 is hardened integrally with the ink of the print pattern 40. Therefore, this is exactly equivalent to the ultraviolet ray hardening characteristic imparted to the print pattern 40 itself. Thus, the decoration layer 44 (see FIG. 3) formed by transfer of the ultraviolet ray hardening resin composite intermingled print pattern 46 itself is supposed to have the surface protection function given by the ultraviolet ray hardening resin 62 distributed in the print pattern and hardened by the ultraviolet ray.

The irradiation of the ultraviolet ray 70 of FIG. 2F which hardens the ultraviolet ray hardening resin composite 62 in the ultraviolet ray hardening resin composite intermingled print pattern 46 is preferably performed while the water-soluble film 30 of the water pressure transfer film 20 is engaged with and wound around the article 10 to which the ultraviolet ray hardening resin composite intermingled print pattern 46 is transferred. Accordingly, although not shown, the ultraviolet ray irradiation step may be preferably performed while the article is still underwater or after the article is taken out from the water, but before the water cleaning for removing the water soluble film. The ultraviolet ray 70 may be irradiated using the well-known ultraviolet ray hardening device containing a light source such as a high-pressure mercury lamp and a metal halide lamp and so on and an irradiation device (lamp house). The ultraviolet ray irradiation may be carried out by two steps of preliminary irradiation (surface irradiation) and original irradiation (total depth irradiation) in another form of embodiment of the invention, the details of which will be described later with reference with FIG. 6 and the following figures.

Figure 3:
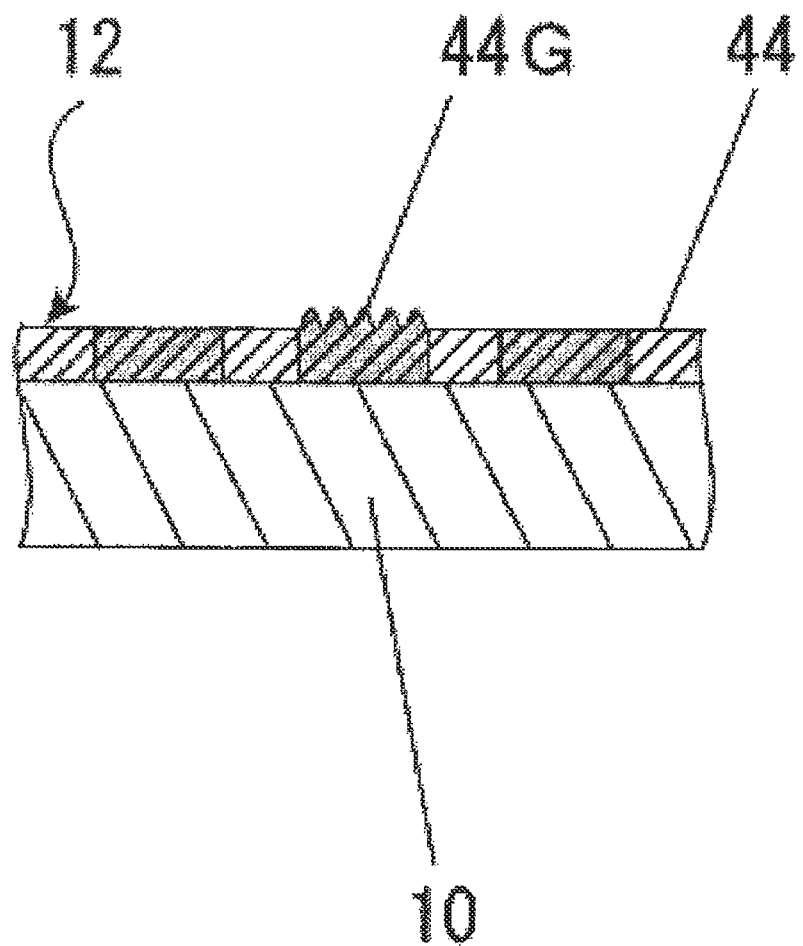
FIG. 3 is an enlarged sectional view of the article having the decoration layer obtained by the method of FIG. 2.

Thereafter, as shown in FIG. 2G, the article 10 is water-washed by a shower 72 and so on to remove the water-soluble film (swollen dissolution film layer) covering the upper surface of the decoration layer 44 formed on the article 10 and then as shown in FIG. 2H the surface of the article 10 is dried by a hot wind 74 whereby the decorated article having the decoration layer 44 transferred under water pressure is completed (see FIG. 3)

The basic principle of the method of the invention lies in forming the print pattern 40 of the water pressure transfer film 20 using the ink with the ultraviolet ray absorbent and/or the ultraviolet ray shielding agent blended and adjusting the amount of penetration (permeability) of the ultraviolet ray into the ink having the ultraviolet ray hardening resin composite intermingled according to the blend ratio of the ultraviolet ray absorbent and/or the ultraviolet ray shielding agent to thereby adjust the gloss obtained by the formation of the fine unevenness on the surface of the ink printed portion of the decoration layer 44 or impart the gloss variation characteristic of the high and low gloss pattern parts adjacent to each other in the ink printed portion of the decoration layer 44.

As aforementioned, the ink for forming the print pattern used for the method of the invention has a base ingredient of coloring agent and resin ingredient and the ultraviolet ray absorbent and/or the ultraviolet ray shielding agent blended with the base ingredient. In addition thereto, the ink may be formed by containing a plasticizer, a dispersing agent and an organic solvent. The ink is the dried ink having volatilization component such as an organic solvent removed because the print pattern formed on the water-soluble film is in the dried state. Hereafter, the "ink" in the invention means the dry ink of the print pattern unless there is any special indication. Although the coloring agent may be coloring pigment or dye on the condition that the matting function can be given, since the coloring pigment is harder to permeate the ultraviolet ray than the dye, the coloring pigment may be especially preferable and therefore, the mode of embodiment of the invention will be described with the color pigment used as the coloring agent.

(Color Pigment)

Although the color pigment of the ink used may be either of an inorganic matter and an organic matter, the inorganic color pigment may be preferably used from viewpoints of shieldability (ultraviolet ray permeability), dispersibility, lightproof, price, etc. Examples of the color pigment are listed as below; carbon black for black pigment; chrome yellow, anthraquinone yellow, mineral fast yellow and titan yellow for yellow pigment; rouge, cadmium red, quinacridone red, permanent red 4R, lithol red, pyrazolone red, watching red calcium salt, lake red D, brilliant carmine 6B, eosine lake for red pigment; prussian blue, cobalt blue, alkali blue lake, Victoria blue lake, phthalocyanine blue and metal-free phthalocyanine blue for blue pigment and titanium white etc. for white pigment. The color pigments may be combined with dye if necessary.

(Resin Component)

There may be used for resin component, acrylic resin, polyurethane resin, polyamide resin, urea resin, epoxy resin, polyester resin and polyvinyl resin (vinyl chloride, vinyl acetate, vinyl chloride-vinyl acetate copolymerization resin), and vinylidene resin (vinylidene chloride and vinylidene fluonate), ethylene-vinyl acetate resin, polyolefin resin, chlorination olefin resin, ethylene acrylic resin, oil based resin and cellulose derivative resin, etc.

(Plasticizer)

There may be used well-known component such as dibutyl phthalate for the plasticizer.

(Dispersing Agent)

There may be used for the dispersing agent, well-known components such as polyvinyl alcohol (PVA), cellulosic polymer, phenolic polymer modified by ethylene oxide, ethylene oxide/propylene oxide polymer, sodium poly-acrylate solution (TEGO, disperse 715W), modified poly-acrylic resin solution (TEGO, disperse 735W), alkylol ammonium salt solution of low molecular poly-carboxylate polymer (BYK-Chemie, Diseperbyk) and alkylol ammonium salt solution of multi-function polymer (BYK-Chemie, Disperbyk-181) and so on, which are used individually or in a combined manner.

(Composition of Weatherproof Ink)

Especially in case where weather resistance is required for the decoration layer formed by the print pattern, preferably, the blue color pigment may be phtalocyanine blue, the yellow color pigment may be isoindolinone and the red color pigment may be quinacridone. The resinous component may be preferably (a) what is formed by blending short oiliness alkyd resin with low molecular nitroglycerine cellulose or (b) what is formed by blending short oiliness alkyd with low molecular nitrocellulose and high molecular nitrocellulose. Low molecular nitrocellulose and/or high molecular nitrocellulose serve to improve the dispersibility of the color pigments and also to improve chromogenic quality. With the high molecular nitrocellulose added, the ink extension is smaller and therefore the component (a) is suitable for printing with much ink charge quantity like such as printing a wood-grain pattern etc. and the component (b) is suitable for printing with little ink charge quantity such as printing a marble pattern etc.

The ultraviolet ray absorbent used for the invention is for making low the ratio of the ultraviolet ray penetrating the ink (the ratio of permeability of ultraviolet ray) by absorbing the ultraviolet ray. The absorbent lowers the ratio of permeability of ultraviolet ray through the print pattern 40 formed by printing the light color ink (including white color ink) of color other than black color and having relatively high permeability of ultraviolet ray so as to make the ratio of permeability of ultraviolet ray through print pattern 40 of light color ink closer to that through the print pattern of black ink. There may be used the conventional ultraviolet ray absorbent such as benzo-phenone based one, benzo-triazole based one, hydroxyphenyl triazine basen one and the benzo-phenone based absorbent is most effective. The blend ratio of the ultraviolet ray absorbent is preferably is 0.1 through 40 weight % relative to the weight of the ink and may be adjusted in accordance with the ratio and the kind of the color pigment within the aforementioned ratio. In particular, in case where the benzophenone based absorbent is used, it may be preferably 0.1 through 30 weight %. Fundamentally, in case where the pigments are of high concentration, the blend ratio is on the minimum side of the numerical range thereof and in case where the pigments are of low concentration, the blend ratio is on the maximum side of the numerical range thereof. Furthermore, there are sometimes more amount of blend of the ultraviolet ray absorbent for the organic pigments than that for the inorganic pigments in order to obtain the same matting effect.

If the amount of blend of the ultraviolet ray absorbent is less than 0.1 weight %, then it will be difficult to impart the cubic feeling effect to be obtained by the change of the glossiness, which is the effect of the invention because the ratio of permeability of ultraviolet ray cannot be lowered and if the amount of blend of the ultraviolet ray absorbent is more than 40 weight % (30 weight % in case of benzophenone based absorbent), then the film will be undesirably worsened because there occurs bleed on the water pressure transfer film 20 when it is stored in a roll-like state.

There may be used for benzophenone based ultraviolet ray absorbent, 4-dihydroxy benzophenone, 2-hydroxy-4-methoxybenzophenone, 2,2' dihydroxy-4-methoxy-benzophenone, 2-hydroxy-4-methoxy-2'-carboxybenzophenone, 2-hydroxy-4-methoxy-5-sulfo-benzophnonetrihydlate, 2,2'-dihydroxy-4,4'-dimethoxy-benzophenone, 2-hydroxy-4-octoxybenzophenone, 2-hydroxy-4-octadecyloxy-benzophenone, sodium 2, and 2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol-mono-benzoate, 2,4-dibenzoylresocinol, 4,6-dibenzoylcinol, hydroxidedecylbenzophenone, 2,2'-dihydroxy-4(3-metacryloxy-2-hydroxy propoxy) and benzophenone, etc.

The ultraviolet ray shielding agent used for the invention is for making low the ratio of penetration of the ultraviolet ray into the ink (the ratio of permeability of ultraviolet ray) by reflecting or scattering the ultraviolet ray in the same manner as the ultraviolet ray absorbent and this agent similarly serves to make the rate of permeability of ultraviolet ray through print pattern 40 of light color ink closer to that through the print pattern of black ink. The ultraviolet ray shielding agent is never limited if it never spoils the tone of ink especially remarkably and has an ultraviolet ray shielding effect, it will not be limited, but rutile type particulate titanium oxide may be especially effective. The ratio of blend (ratio of occupation in ink) of the ultraviolet ray shielding agent may be 0.1 weight % or more, but 30 or less weight % may be preferred from the viewpoints of desirable states such as its dispersibility into ink, the viscosity of the ink when distributed and the tone of the ink. The ratio of blend may be adjusted according to the ratio and kind of the color pigments within the aforementioned range. Furthermore, the ultraviolet ray shielding agent may be preferably in the shape where it is closely arranged relative to the surface where the ultraviolet ray is irradiated and more preferably in the shape closer to a spherical shape, for example.

In this manner, since the ultraviolet ray absorbent and the ultraviolet ray shielding agent have the common operation to lower the rate of permeability of the ultraviolet ray through the ink, they will be generally named as a lowering agent for permeability of the ultraviolet ray hereafter in the specification. The ultraviolet ray absorbent and the ultraviolet ray shielding agent may be used in an individual or combined state. They may be used while they are appropriately selected and adjusted according to the set value of the permeability of ultraviolet ray through the ink and various characteristics such as a change degree of the color of the ink by addition of the ultraviolet ray shielding agent, the viscosity and the coating characteristic (mechanical strength, adhesion and light resistance, etc.) of the decoration layer after hardened by the ultraviolet ray and further according to the cost.

In order to prohibit the polymerization reaction of the ultraviolet ray hardening resin by the penetration of the ultraviolet ray and adjust the progress of hardening the ultraviolet ray hardening resin composite, a photo polymerization prohibition agent may be added to the ink if necessary. There may be used for the photo polymerization prohibition agent, conventional agent of phenol based compounds such as hydroquinone, 2,6-di-t-butyl-p-cresol, 2,2-methylene-bis-(4-methyl-6-t-butylphenol), 1,1,3-tris-(2-methyl-4-hydroxy-5-t-buthylphenol) butane, etc., sulfur based compounds such as dilauryl thiodioproprionate, etc., phosphorus compounds such as triphenyl phosphite, etc. and amine based compounds such as phenothiazine, etc. The amount of addition of the photo polymerization prohibition agent may be suitably adjusted within the range where the film physical properties of the decoration layer after hardened are never damaged.

Although the decoration layer 44 is formed by being hardened in the state where the ultraviolet ray hardening resin composite is integrally mixed with the print pattern 40 and more particularly the ultraviolet ray hardening resin composite is intermingled within and integral with the ink of the print pattern 40, the ultraviolet ray hardening resin composite has the amount of penetration of the ultraviolet ray larger or smaller according to the permeability ratio of ultraviolet ray of the ink of the print pattern. For example, as the amount of the ultraviolet ray permeability lowering agent blended with the light color ink other than black ink increases so as to get closer to the ultraviolet ray permeability rate of the black ink, the decoration layer portion (the ink printed portion) where the light color ink having the larger amount of the ultraviolet ray permeability lowering agent blended is transferred has the fine unevenness generated on the decoration layer with the result that the glossy feeling will be observed to decrease. Thus, it will be understood that the gloss of the corresponding portion of the decoration layer (the ink printed portion with the ultraviolet ray permeability lowering agent) 44G (see FIG. 3) can be adjusted according to the amount of blend of the ultraviolet ray permeability lowering agent blended in the ink.

Figure 4:
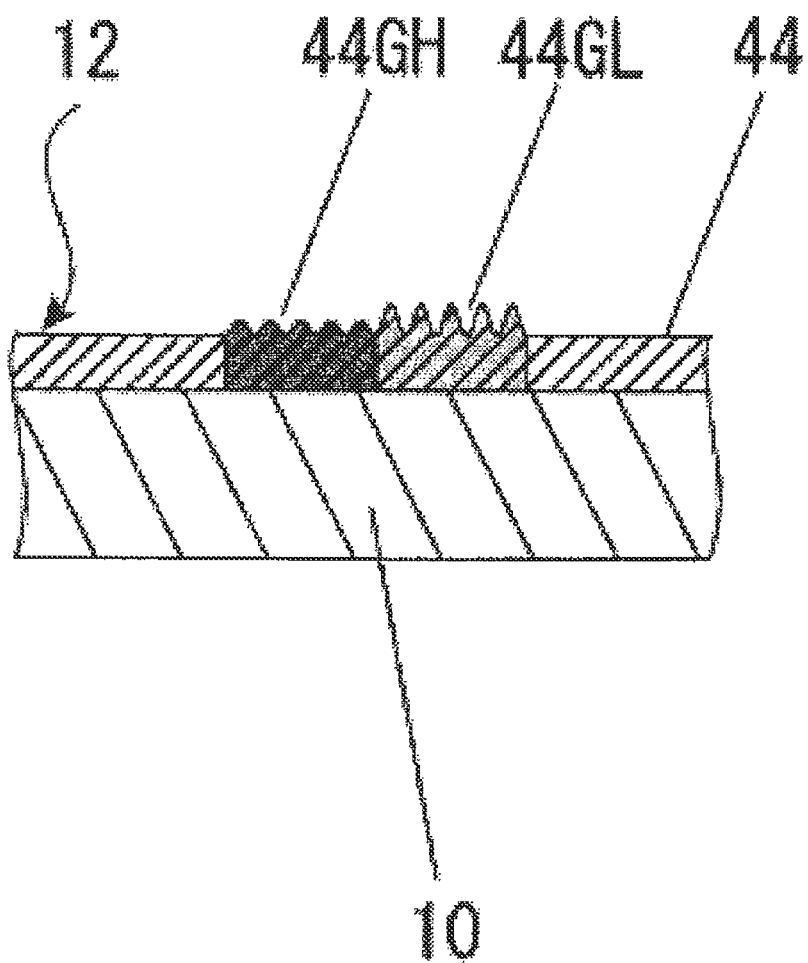
FIG. 4 is a partially enlarged sectional view where the decoration layer of FIG. 3 is further enlarged.

By utilizing the principle of such an adjustment of the gloss, the high gloss pattern part and the low gloss pattern part can be made adjacent to each other in the ink printed portion of the decoration layer 44 to thereby impart the gloss variation characteristic and therefore the cubic feeling effect thereto (see FIG. 4). Namely, as aforementioned, there occurs fine unevenness on the decoration layer portions (the ink printed portions) at the position where the light color ink having the large amount of the ultraviolet ray permeability lowering agent blended with the light color ink to thereby make the rate of ultraviolet ray permeability of the light color ink closer to that of the black ink is transferred whereby the low gloss pattern part 44GL having the glossy feeling decreased is formed. On the other hand, there occurs little fine unevenness on the decoration layer portions (the ink printed portions) at the position where the light color ink having the lesser amount of the ultraviolet ray permeability lowering agent blended with the light color ink or no ultraviolet ray permeability lowering agent blended is transferred whereby the high gloss pattern part 44GH having the high glossy feeling observed is formed. With the difference between these glossy feelings adjacent to each other on the decoration layer in response to the print pattern, there may be provided a product (a water pressure transfer article) having the cubic feeling effect imparted to the decoration layer by the existence of the difference between the glossy feelings.

As aforementioned, the water pressure transfer film used for the invention is formed by applying the print pattern 40 on the water-soluble film 30 and the print pattern 40 is characterized by being formed by printing the ink having the ultraviolet ray permeability lowering agent blended with the top layer (the layer in contact with the water-soluble film and serving as the surface when it is transferred) on the side of ultraviolet ray irradiation of the portion to be matted by ultraviolet ray hardening. In other words, the print pattern 40 is formed by printing many ink layers formed of ink halftone dots (dot pattern including what is generally called a cell by gravure printing) of ink of various colors in a superposed manner in spite of any kind of printing methods and in this case, various colors are expressed by the superposition of each of the ink halftone dots (subtractive color mixture) and the arrangements of the ink halftone dots (juxtaposition color mixture). The ultraviolet ray permeability lowering agent is blended with the ink layer of the print patter corresponding to the ink layer (top layer) positioned nearest to the ultraviolet ray irradiation side of the decoration layer obtained after transfer of the print pattern. Thus, with the ink layer having the ultraviolet ray permeability lowering agent blended being the one corresponding to the top layer of the decoration layer, the permeability of the ultraviolet ray into the ink layer within the print pattern is limited whereby there is formed fine unevenness on the surface of the decoration layer to thereby impart the matting effect (low gloss property) thereto. The inner layer of the print pattern (the layer on the side of the surface of the transfer film) may be formed of usual ink or ink having the ultraviolet ray permeability lowering agent blended. Although the method of printing the print pattern 40 on the water-soluble film 30 is not particularly limited, there may be used the conventional method such as gravure printing, offset printing and ink jet printing and the composition and the superposition of the halftone dots of the ink layer having the ultraviolet ray permeability lowering agent blended may be adjusted according to the color arrangement of each printing method.

Figure 5:
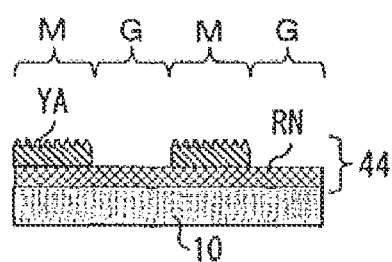
FIG. 5 is a sectional view showing some examples of the ink layer forming the decoration layer obtained by transfer of the print pattern.
Figure 5:
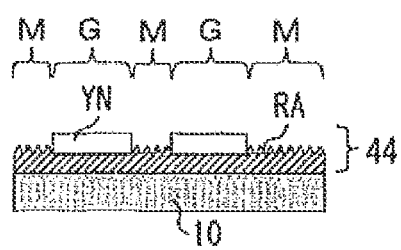
Figure 5:
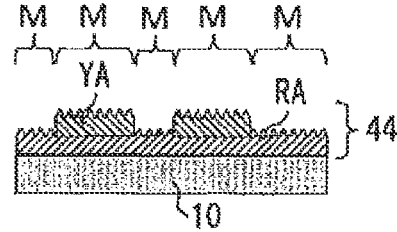
Figure 5:
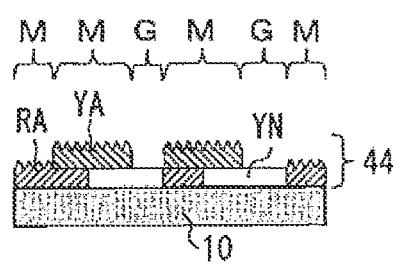
Figure 5:
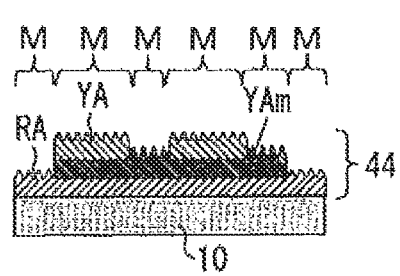
Figure 5:
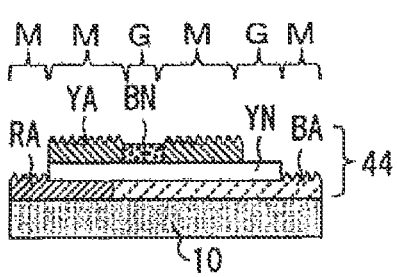

FIG. 5 is a schematic diagram showing some examples of how to superpose the ink layers of the print pattern 40 based on the ink compositions (yellow, red and blue) in the conventional color printing method commercially available and each ink layer of this figure is expressed by the ink coated layer (all-over coated layer), but the superposition of the halftone dots (dot patterns) of the actual print pattern also has the same basic principle of appearance of the matting effect. FIG. 6(A) through FIG. 6(F) show examples where the decoration layers 44 are formed by two or three ink layers. In these figures, the inks having the same hatching applied show the same color and the thick hatching shows the ink layer of color having the ultraviolet ray permeability lowering agent blended and as the thicker hatching shows the ink layer having more ultraviolet ray permeability lowering agent blended. The portion expressed by "M" shows the portion where the ultraviolet ray permeability lowering agent is blended in the uppermost ink layer to thereby impart the low gloss (matting effect) thereto and the portion expressed by "G" shows the portion where there is no ultraviolet ray permeability lowering agent blended in the uppermost ink layer to thereby impart the high glossiness thereto. In the signs used in these figures, the signs "Y", "B" and "R" attached to the head thereof indicate yellow ink, blue ink and red ink, respectively and the signs "A". "Am" and "N" attached behind the indication of each color indicate the ink having the ultraviolet ray permeability lowering agent added, the ink having more ultraviolet ray permeability lowering agent added than "A" and the usual ink having no ultraviolet ray permeability lowering agent added, respectively. Therefore, for example, "YA" indicates the yellow ink having the ultraviolet ray permeability lowering agent added. "YAm" indicates the yellow ink having more ultraviolet ray permeability lowering agent than "YA" added and "YN" indicates the usual yellow ink having no ultraviolet ray permeability lowering agent added They are true of other color inks.

As noted from FIG. 5(A) through FIG. 5(F), the ink layer forming the decoration layer (the layer obtained by carrying out the water pressure transfer of the print pattern on the article 10) is a multi-layer of two or more layers. In each layer, the upper ink layers having the ultraviolet ray permeability lowering agent blended are applied in a spaced manner on the lower ink layer having no ultraviolet ray permeability lowering agent blended (see FIG. 5(A)), or the upper ink layers having no ultraviolet ray permeability lowering agent blended or the single ink layer, the two or more ink layers of different colors having the ultraviolet ray lowering agent blended are applied in a spaced manner on the lower ink layer having the ultraviolet ray permeability lowering agent blended (see FIGS. 5(B),(C) and (E)). Otherwise, the single or two or more lower ink layers are formed by alternately applying the ink layer having no ultraviolet ray permeability lowering agent blended and the ink layer having the ultraviolet ray permeability lowering agent blended or the ink layers of different colors having the ultraviolet ray permeability lowering agent blended lowering agent blended and there are applied on the lower ink layers the ink layers of same or different colors having the ultraviolet ray permeability lowering agent blended or not blended in an adjacent or spaced manner (see FIGS. 5(D) and (F)). In any example, the adjacent ink printed portions have different glossiness according to the existence of the ultraviolet ray permeability lowering agent, the amount of blend thereof and the position of the upper and lower layers to impart the gloss variation thereto. A method for superposing the ink layers is never limited to the examples of FIG. 5 and there are various methods for superposition and it will be understood that there will occur various gloss variation according to it.

It will be noted from these examples that there occur the high gloss part (including the portion not matted and the portion matted, but having the low degree of matting) (the portion expressed by "G") and the low gloss part (the portion matted and having the gloss lower than the high gloss part) (the portion expressed by "M") adjacent to each other to thereby provide the cubic feeling effect to the decoration layer, but the degree of gloss is adjusted by the existence of the blend of the ultraviolet ray permeability lowering agent in the ink of the uppermost layer, the amount of blend thereof, the difference of colors and the position of the upper and lower layers. In case where the ultraviolet ray permeability lowering agent is blended in the ink layer of light color, but the color tone is different from that desired, the other ink layer can be added to adjust the color tone to the desired one. It should be understood that what is meant by the top layer is the layer exposed without any upper layer in addition to the uppermost layer of the multilayer. Since the gravure printing and the offset printing in both of which the color is expressed by dot patterns can adjust the degree of gloss in addition to the harmony of color and the kind of ink color based on this principle, a variegated color can be expressed. By reflecting this on a design pattern, the gloss variation of early material portion and late material portion of grain can be imparted to the light grain pattern, for example, which was difficult to be obtained until now whereby the design having the feeling of quality of a genuine article can be expressed.

Although the example where the invention is applied to the print pattern based on the conventional color printing technique (color expression by layer superposition of yellow, red and blue) as aforementioned, the ultraviolet ray permeability lowering agent may be added to the ink the print pattern using color inks prepared by mixing primary color inks to thereby generate the matting effect, of course.

Although the principle of the invention suitably apply to the ink other than the ink of low ultraviolet ray permeability such as the black ink to adjust the glossiness of the ink printed portion, the ultraviolet ray permeability lowering agent may be added to the ink of low ultraviolet ray permeability such as the black ink to further lower the ultraviolet ray permeability of the ink whereby the glossiness of the ink printed portion may be further lowered.

The difference of degree of gloss between the high gloss pattern part 44GH and the low gloss pattern part 44GL adjacent to each other in the water pressure transfer article may be preferably 10 or more, but the even in case of that of less than 10, the difference of degree of gloss will sometimes be felt large. That is, the numerical value by the gloss meter and the visual feeling never necessarily agree 100% and the visual feeling is generally blunt within the range of 30 through 60 and will become sharp with the range deviated. For example, even in case where the numerical value of the differences of gloss degree is slightly 5, there is felt little change in the gloss feeling by the difference of the gloss degree of 5 within the range of 30 through 60, but there is felt substantive change by the difference of the gloss degree of 5 with the range deviated upwardly or downwardly. Of course, in case of the larger difference of gloss degree, the difference of gloss will be more substantively felt, but if the gloss degree of the low gloss pattern portion is less than 20, then there is felt no gloss at a glance and therefore if the difference of gloss degree between the low gloss pattern part and the high gloss pattern part adjacent to the low gloss pattern part is 10, the difference between the low and high gloss pattern parts will be remarkably felt. However, the gloss degree of the high and low gloss pattern parts within the range of 30 through 60 intends to be never excluded.

In the method of the invention, a constitution pigment and/or an inorganic pigment may be added to the ink of the print pattern in addition to the aforementioned ultraviolet ray permeability lowering agent in order to provide the same obliterating power as the black pigment to the light color ink. With the constitution pigment and/or the inorganic pigment added, since the matting will be a little cancelled, the glossiness will be able to be adjusted. Since the constitution pigment is cheaper than the ultraviolet ray permeability lowering agent, with the constitution pigment used in order to decrease the quantity of the ultraviolet ray permeability lowering agent, the ink having the equivalent matting effect can be more cheaply provided. The constitution pigment used may be calcium carbonate, talc, kaolin, barium sulfate, aluminum hydroxide, etc., for example, but in consideration of the price and the obliterating power, calcium carbonate is most preferred.

The ultraviolet ray hardening resin composite for the activating agent used for the invention includes photo-polymerization ingredient and photo-polymerization initiator as essential ingredients. The photo-polymerization ingredient has the essential ingredient of photo-polymerization monomer and may include photo-polymerization pre-polymer as a second ingredient. Although the photo-polymerization pre-polymer is not the essential ingredient, it may be preferably contained together with the photo-polymerization monomer for purpose of improvement in the film strength after hardened by ultraviolet ray and the adhesion.

The photo-polymerization pre-polymer to be used may be either one or a combination of any of acrylic oligomer, polyester based oligomer, epoxy acrylate based oligomer or urethane acrylate based oligomer. The photo-polymerization monomer serves as a dilute of the photo-polymerization pre-polymer to maintain the practical work efficiency of the resin composite, itself participates in the polymerization when the ultraviolet ray is irradiated and also serves as a functional ingredient (ink dissolution component) reproducing the adhesion of the print pattern in the dry state in the water pressure transfer method. The photo-polymerization monomers may be any of a mono-functional monomer and a polyfunctional monomer used according to their characteristic. Since the photo-polymerization monomer which is the non-solvent activating ingredient in the ultraviolet ray hardening resin composite reproduces the adhesion of the print pattern of the transfer film in a good manner, the ultraviolet ray hardening resin composite may be preferably a non-solvent type one containing no solvent such as thinner and alcohol, but may contain a solvent ingredient as auxiliary ingredient in such a degree as has no intention of (participation in) the ink solubility of the print pattern.

There may be added non-reactive resin (acrylic polymer etc.) in the ultraviolet ray hardening resin composite used for the invention in order to accommodate the intensity and chemical resistance of the decoration layer and the adhesion thereof. Moreover, there may be added a sensitizer, a filler, an inactive organic polymer, a leveling agent, a thixotropy imparting agent, a thermal polymerization prohibition agent, a matting ingredient, etc.

The ultraviolet ray hardening resin composite of the activating agent may be prepared so as to have a function to generate the matting effect of the invention and according to the conditions for maintaining various characteristics required for the decoration layers, such as the intensity of the decoration layer, the adhesion, the chemical resistance and the weather resistance, etc., for example and may have the following composition.

(1) Photo-polymerization pre polymer: 0 to 70 weight %
(2) Photo-polymerization monomer: 20 to 95 weight %
(3) Photo-polymerization initiator: 0.5 to 10 weight %

The photo-polymerization monomer may be preferably a bi-functional monomer, which more preferably contains multi-functional monomer of 0 to 30 weight %. The additives for the non-reactive ingredient may be added if necessary and have the following additives (4) through (6) with a ratio relative to the total of the components (1) through (3).

(4) Non-reactive resin: 2 to 12 weight %
(5) Weather resistance imparting agent
   UV-A 0.5 to 8 weight %
   HALS 1.5 to 3.5-weight %
(6) Leveling agent 0.01 to 0.5 weight %

Especially as the ultraviolet ray hardening resin composite containing the matting agent is hardened in the state where it is wholly united with the print pattern, there is obtained the matting component's own taste different from the matting effect by the fine unevenness of the print pattern formed by the hardening shrinkage of the component of the ultraviolet ray hardening resin composite of the invention. Furthermore, since the matting component acts so as to lower the gloss of the high gloss pattern part, the whole tone is reduced so as to reduce the difference of the gloss degree between the high gloss pattern part and the low gloss pattern part and therefore there is made felt a taste of "Wabi and Sabi" in Japanese (meaning "loneness" in English) whereby a design expression of the decoration layer can be enhanced. The matting agent used may be conventional ones such as resin beads, glass beads and particulate silica, etc.

Next, as previously described, in the method of the invention, the ultraviolet ray may be irradiated on the decoration layer 44 in two divided steps or stages (the preliminary step and the original step) under the predetermined irradiation conditions described later. Among the two steps of the irradiation of the ultraviolet ray, the irradiation of the preliminary stage (referred to as "preliminary irradiation" hereinafter) is to irradiate a low permeability ultraviolet ray 70L which penetrates only through the area near the surface of the decoration layer 44 before the decoration layer 44 hardens as shown in FIG. 6(A) whereby the surface hardened layer 44C including the fine surface unevenness variation part 44CV by contraction of the ink is formed on the surface of the ink printed portion 44I of the decoration layer 44 by the preliminary irradiation. The height of the surface unevenness variation part 44CV may be controlled by the irradiation conditions of the preliminary irradiation of the ultraviolet ray, but the details will be described later. The portions other than the surface unevenness variation parts 44CV among the surface hardened layer 44C are the surface hardened layer portions of the ultraviolet ray hardening resin composite filled between the adjacent ink printed portions 44I. Although only one ink printed portion 44I is shown in FIG. 6(A), in practice, in case that the print pattern is "wood-grain pattern", for example, the ink printed portions 44I have the amount of absorption of the ultraviolet ray different from each other according to the characteristics (nature) of the ink such as the oil absorption or the concentration of the ink pigments other than the ultraviolet ray permeability of the ink, of course, the height of the fine surface unevenness variation part 44CV changes by contraction of the ink changes. The surface unevenness variation part 44CV of FIG. 6(A) is simply shown to have only one surface unevenness variation part 44CV having the predetermined height determined according to the characteristic of the ink pigments.

In the invention, regarding the ultraviolet ray permeability, what is meant by the ultraviolet ray permeability of the ink is the level of ultraviolet ray permeability and what is meant by the permeability of the ultraviolet ray itself is the permeability force which the ultraviolet ray has. With both of them associated with each other, the ultraviolet ray penetrates within the ink layer with the predetermined depth.

The irradiation in the original stage (referred to as "original irradiation" hereinafter) is to irradiate the high permeability ultraviolet ray 77H permeating the whole thickness of the decoration layer 44 as shown in FIG. 6(B) and by the original irradiation are completely hardened the whole thickness of the decoration layer 44 while maintaining the surface unevenness variation part 44CV of the decoration layer 44, as shown in FIG. 6(B). If the preliminary irradiation step is omitted and only the high permeability ultraviolet ray is irradiated (that is only the original irradiation is carried out), which is different from the invention, then the decoration layer 44 of the whole thickness is completely hardened in the state where there is no fine surface unevenness variation part 44CV by the contraction of the ink depending on the irradiation conditions or although not illustrated, there is obtained only the height variation having the height of degree where it cannot be visually recognized, that is the degree not reaching the predetermined value and therefore, there cannot be sometimes obtained the predetermined gloss. Thus, there are preferably carried out two stage irradiations of the preliminary and original irradiations.

The ultraviolet ray 52 for the preliminary irradiation is the low permeability ultraviolet ray of 200 nm or more and less than 320 nm and the preliminary irradiation of the ultraviolet ray is preferably carried out under the condition where the peak intensity (Ip)[mW/cm$^2$] and the integral of light (E)[mJ/cm$^2$]) meet the following formula 1.

$$60E^{-1.4} \leq Ip \leq 5765E^{-1.85} \quad (1)$$

wherein E is >0 and Ip is >0

What is meant by "the low permeability" (the low permeability force the ultraviolet ray has) is the property of selectively hardening the area near the surface of the decoration layer in the state where the inner portion of the decoration layer is principally not hardened or semi-hardened, which is caused by the quantity of the ultraviolet ray attenuated due to the hardening reaction in the area near the surface of the decoration layer whereby the quantity of the ultraviolet ray sufficient for hardening the inside of the decoration layer cannot reach the inside thereof. In other words, it is the property that the shallow portion of the decoration layer is hardened, but the deep portion of the decoration layer is not hardened. The formula 1 was formulated by experimentally verifying the range where the desired matting effect can be obtained on the relation between the conditions of the peak intensity (Ip)[mW/cm$^2$] and the integral of light (E) [mJ/cm$^2$] and the matting effect by the invention. Namely, the more desirable matting effect can be obtained in this area.

The preliminary irradiation of the low permeability ultraviolet ray 52 is preferably carried out under the conditions satisfying that the peak intensity (Ip) is 0.5 [mW/cm$^2$] or more and 6 [mW/cm$^2$] or less and the integral of light (E) is 5 [mJ/cm$^2$] or more and 120 [mJ/cm$^2$] or less.

The method of the preliminary irradiation is never particularly limited if the irradiation is carried out so that the aforementioned conditions can be fulfilled, but the irradiation intensity of the light source (high pressure-mercury lamp) may be adjusted, or otherwise the light source may be arranged so that the optical axis of the light source for the preliminary irradiation may separate intentionally from the irradiated article whereby a weak light from the peripheral part of the light source may be irradiated on the irradiated article The ultraviolet ray 54 for the original irradiation is the high permeation ultraviolet ray (of high permeability which the ultraviolet ray has) 70H of 320 nm or more and less than 390 nm and the original irradiation by this ultraviolet ray is carried out under the conditions satisfying that the peak intensity (Ip$_1$) is 200 [mW/cm$^2$] or more and 400 [mW/cm$^2$] or less and integral of light (E$_1$) is 1000 [mJ/cm$^2$] or more and 4000 [mJ/cm$^2$] or less. As the ultraviolet ray satisfying the conditions is irradiated on the decoration layer 44, the ultraviolet ray 70H can permeate the whole thickness (usually 10-20 micrometers) of the decoration layer 44 and can completely harden the decoration layer 44. This original irradiation may be appropriately carried out by using an A type metal halide lamp irradiating the high permeability ultraviolet ray 70H.

What is meant by "high permeability" is the property of hardening the whole decoration layer by the amount of the ultraviolet ray sufficient for completely hardening the inside of the decoration layer reaching the inside thereof or the ultraviolet ray being able to permeate the decoration layer and reach the back face thereof.

With such a range of the peak intensity and the integral of light for the original irradiation of the ultraviolet ray used, the decoration layer can be hardened while the fine unevenness of the decoration layer formed by the preliminary irradiation is maintained and therefore, the matting effect (the low glossiness) according to the invention can be accomplished. If the peak intensity and the integral of light for the original irradiation is less than the lower limit of the aforementioned range, then the decoration layer will be sometimes unable to be fully hardened or to maintain the physical property (strength, endurance, etc.) for the hardened film. If the peak intensity and the integral of light for the original irradiation is more than the upper limit of the aforementioned range, then there tends to occur faults such as yellowing, etc. in the transfer article, especially in the resin article and therefore the aforementioned conditions of the original irradiation is preferred The surface unevenness variation part 44CV may have an appropriate height variation by adjusting the conditions of the ultraviolet ray irradiation conditions. Especially, in case of the two stage irradiation process of the preliminary irradiation and the original irradiation, in general, in the range of the irradiation conditions (preferably, the range of the formula 1) where there can be formed the surface hardened layer 44C including the fine surface unevenness variation part 44CV by the contraction of the ink, if the peak intensity of the ultraviolet ray in the preliminary irradiation gets higher and higher and if the integral of light gets more and more, the height variation (difference) can be more and more enlarged. As already described, the height of unevenness variation part 44CV differs also according to the characteristic of the ink pigments, but the above explanation describes that in case where the ink having the ink pigments of the same characteristic is used, the height of the surface unevenness variation part of the decoration layer can be controlled by the irradiation conditions of the ultraviolet ray for preliminary irradiation. This means that even if the ink has the ink pigments of the same characteristic, there can be obtained the different height in the different positions according to the irradiation conditions of the ultraviolet ray for preliminary irradiation.

Figure 7:
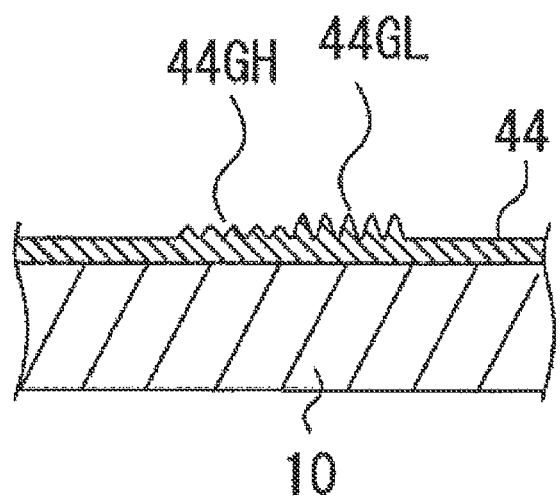
FIG. 7 is an enlarged sectional view of an article with a decoration layer having high and low gloss pattern parts formed adjacent to each other by the water pressure transfer method of FIG. 6.

FIG. 7 shows the decoration layer 44 having the high and low gloss pattern parts 44CVH and 44CV. The highness and lowness of the gloss are set by the amount of blend of the ultraviolet ray permeability lowering agent blended with ink and the peak intensity of the ultraviolet ray on the preliminary irradiation of the ultraviolet ray as already described.

Although the aforementioned form of embodiment of the invention is described with respect to the print pattern having the color pigment containing ink used, the invention may be applicable also to the print pattern using the ink having no color pigment contained. The ink of such a print pattern may have the ultraviolet ray permeability lowering agent blended therewith so as to adjust the ultraviolet ray permeability or the ultraviolet ray shielding agent presenting a white color system for colorant blended therewith so as to have a function of both of coloring and adjustment of the ultraviolet ray permeability. In this case, a dye may be added as coloring material. Such an ink may include what has no dye contained, but is colored by slight additives (ultraviolet ray absorbent, for example) other than the dye. In this meaning, the ink has a concept larger than the ink of strict meaning

EXAMPLES

Figure 6:
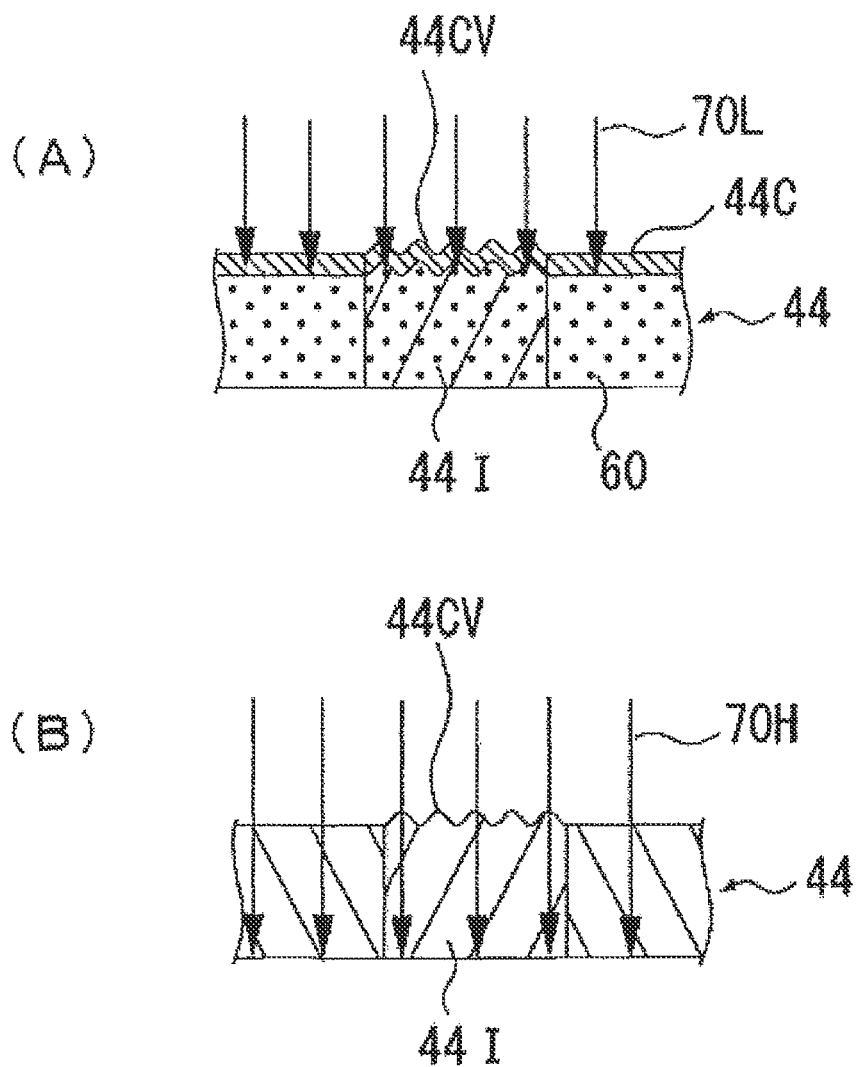
FIG. 6 sequentially illustrates the hardening steps of the method according to the second form of the invention carrying out the hardening process of the ultraviolet ray hardening resin in two steps.

Concrete Examples of three different forms of the invention will be explained while being compared with Comparisons. Among Examples of three forms. Examples of first form are the ones in which a simple color print pattern was transferred under water pressure on an article of flat board and had the ultraviolet ray irradiated by the two stage irradiation of the preliminary stage and the original stage as shown in FIG. 6 to obtain the decoration layer of predetermined gloss. Examples of second form are the ones in which a two color print pattern was transferred under water pressure on an article of flat board and had the ultraviolet ray irradiated by the two stage irradiation to obtain the decoration layer having the gloss variation characteristics of the high and low gloss pattern parts adjacent to each other on the ink printed portions. Examples of third form are the ones in which a simple color print pattern was transferred under water pressure on articles of flat board and of box and the ultraviolet ray was irradiated by the two stage irradiation on various conditions to obtain the decoration layer having the matting effect (the low glossiness).

Examples 1 Through 25 and Comparisons 1 Through 5 of First Form

Examples 1 through 25 and Comparisons 1 through 5 of first form had the following ink, activating agent, transfer film and additive agents used;
1. Composition of Ink
  There were used the inks of four colors of yellow, red, blue and black and the base composite of each of the inks had a color pigment, a resinous component and a dispersing agent contained and also an organic solvent added thereto in order to enable the coating of the ink. Commercial varnish was used for some of the resinous component and the solvent. The color pigments of the four color inks were as follows.
Yellow Ink: Metal acid compound (inorganism)
Brand Name: SICOPAL YELLOW L1600
  (Manufactured by BASF)
Red Ink: Naphthol dye (organism)
Brand Name NOVOPERM RED F5RK
  (Manufactured by CLARIANT)
Blue Ink: Copper phthalocyanine (organism)
Brand Name: PV FAST BLUE A2R black
  (Manufactured by CLARIANT)
Black Ink: Carbon based ink (inorganism)
Brand Name: COLOUR BLACK S170 POWDER
  (Manufactured by EVONIC DEGUSSA)

The concentration of the color pigments of the inks in Table I is indicated by the ratio of weight (weight %) of the color pigments occupied in the sum total of the weight of ingredients (the solid ingredients when dried) other than the ultraviolet ray permeability lowering agent in the ink and adjusted by variously changing the blend ratio of the color pigments and the varnish.

The varnish was medium ink (KLCF medium manufactured by THE INKTECH: 17 weight % of dried solids containing resinous component). The solvent had the ethyl acetate further blended in addition to the solvent ingredients (toluene, ethyl acetate, isopropyl alcohol, etc.) contained in the said medium ink and the blend weight thereof was 20% relative to the total weight of the color pigments and the varnish. The dispersing agent was DISPERBYK145 (Manufactured by BYK CHEMIE) and this was added by 3% relative to the weight of the color pigments. As already described, the indication of the value of the ink ingredient of Table 1 is a weight value in dry ink.
2. Activating Agent
  There were used the activating agents (A) and (B) of the ultraviolet ray hardening type resin composite of the following two kinds
(A) The brand name "UBIC S CLEAR HE" manufactured by OHASHI CHEMICAL INDUSTRIES CO., LTD. for the clear activating agent of the combination of oligomer and monomer
(B) The brand name "UBIC S MATTING CLEAR HE" manufactured by OHASHI CHEMICAL INDUSTRIES CO., LTD. for the monomer based (matting) activating agent.
3. Transfer Film
  There was used the transfer film having the single color pattern applied and formed on the commercially available PVA (polyvinyl alcohol) film (Brand Name: HYTHERON E-100) by a bar coater so that the film thickness after dried became 3 micrometer.
4. Additives of Ink
  In order to adjust the gloss of the decoration layer, there were used either or both of (a) the ultraviolet ray absorbent and (b) the ultraviolet ray shielding agent and (c) the constitution pigments among the following additives for the ink.
(a) Ultraviolet ray absorbent (UVA):
  (a1) SEESORB 106, benzophenone (BP) based absorbent manufactured by SHIPRO CHEMICAL
  (a2) JF-77, benzotriazole (BTA) based absorbent manufactured by JOHOKU CHEMICAL
  (a3) TINUVIN400, phenyltriazine based (PTA) absorbent manufactured by CIBA, JAPAN
(b) Ultraviolet ray shielding agent:
  (b1) ST455 manufactured by TITAN KOGYO, rutile type titanium dioxide (TiO2) particulate (TIO-R1) having an average particle diameter of 20 nm (short axis)×120 nm (long axis)
  (b2) ST4865A having the particle diameter of short axis relative to long axis larger than that of TIO-R1 and manufactured by TITAN KOGYO, rutile type titanium dioxide (TiO2) particulate (TIO-R2) having an average particle diameter of 30 nm (short axis)×100 nm (long axis)

(b3) ST30EHJ manufactured by TITAN KOGYO, Anatase type titanium oxide (TiO2) particulates (TIO-A)
(b4) FINE-50W-LP2 manufactured by SAKAI CHEMICAL, zinc oxide particulate (ZnO)
(c) Constitution pigments: SUNLIGHT SL-1500 manufactured by TAKEHARA CHEMICAL, calcium carbonate The amount of addition (blend ratio) of (a) the ultraviolet ray absorbent (UVA) and (b) the ultraviolet ray shielding agent in Table 1 is a weight percentage (weight %), at which each is occupied in the ink. The amount of addition of (c) the constitution pigments in Table 1 is a ratio (weight part) relative to 100 weight part of the ingredient (solid component when dried) other than the ultraviolet ray permeability lowering agent in the ink.

transfer film to thereby carry out the water pressure transfer of the print pattern on the article, the article was removed out of the water and is conveyed and moved while mounting it on a belt conveyor within an ultraviolet ray hardening furnace where hardening was sequentially carried by the preliminary and original irradiation of the ultraviolet ray and finally the article was water-washed and dried to obtain the water pressure transfer article (product). The conditions of irradiation of the ultraviolet ray was set at the peak intensity (Ip) of 2 mW/cm$^2$ and the integral of light (E) of 45 mJ/cm$^2$ for the preliminary irradiation using the high pressure mercury lamp (HAK 125 manufactured by GS YUASA POWER SUPPLY) and at the peak intensity (Ip) of 300 mW/cm$^2$ and the integral of light (E) of 2300 mJ/cm$^2$ for the original irradiation using

TABLE 1

| | Ink | | | | | | Evaluation | | | |
|---|---|---|---|---|---|---|---|---|---|---|
| | Coloring pigment | (a) UV ray absorbent | | (b) UV ray shielding agent | | (c) | | Gloss (Value of gloss) | | | |
| | Amount of addition [weight %] | Material | Amount of addition [weight %] | Material | Amount of addition [weight %] | Constitution pigment Amount of addition [weight part] | Activating agent | Yellow (Y) | Blue (B) | Red (R) | Black (K) |
| Example 1 | 59.5 | BP | 2.9 | — | — | — | A | 70 | 70 | 70 | — |
| Example 2 | 59.5 | BP | 5.6 | — | — | — | A | 65 | 50 | 50 | — |
| Example 3 | 59.5 | BP | 10.6 | — | — | — | A | 20 | 30 | 30 | — |
| Example 4 | 39.5 | BP | 3.8 | — | — | — | A | 80 | 80 | 80 | — |
| Example 5 | 71.6 | BP | 6.7 | — | — | — | A | 20 | 20 | 20 | — |
| Example 6 | 59.5 | BTA | 10.6 | — | — | — | A | 40 | 40 | 40 | — |
| Example 7 | 59.5 | PTA | 10.6 | — | — | — | A | 40 | 40 | 40 | — |
| Example 8 | 59.5 | — | — | TIO-R1 | 5.6 | — | A | 15 | 15 | 15 | — |
| Example 9 | 59.5 | — | — | TIO-R1 | 10.6 | — | A | 5 | 5 | 5 | — |
| Example 10 | 71.6 | — | — | TIO-R1 | 17.7 | — | A | 5 | 5 | 5 | — |
| Example 11 | 59.5 | — | — | TIO-R2 | 10.6 | — | A | 4 | 4 | 4 | — |
| Example 12 | 59.5 | — | — | TIO-A | 10.6 | — | A | 30 | 30 | 30 | — |
| Example 13 | 59.5 | — | — | ZnO | 10.6 | — | A | 30 | 30 | 30 | — |
| Example 14 | 59.5 | BP | 5.6 | TIO-R1 | 5.6 | — | A | 10 | 10 | 10 | — |
| Example 15 | 71.6 | BP | 6.7 | TIO-R1 | 12.5 | — | A | 5 | 5 | 5 | — |
| Example 16 | 79.7 | BP | 7.4 | TIO-R1 | 13.7 | — | A | 5 | 5 | 5 | — |
| Example 17 | 59.5 | BP | 2.9 | TIO-R1 | 2.9 | 23.8 | A | 30 | 30 | 30 | — |
| Example 18 | 50.9 | BP | 2.5 | TIO-R1 | 2.5 | 57.7 | A | 40 | 40 | 40 | — |
| Example 19 | 59.5 | BP | 5.6 | — | — | — | B | 40 | 40 | 40 | — |
| Example 20 | 59.5 | — | — | TIO-R1 | 5.6 | — | B | 20 | 20 | 20 | — |
| Example 21 | 59.5 | BP | 2.9 | TIO-R1 | 2.9 | 23.8 | B | 20 | 20 | 20 | — |
| Example 22 | 50.9 | BP | 4.8 | TIO-R1 | 4.8 | — | A | — | — | — | 5 |
| Example 23 | 79.7 | — | — | TIO-R1 | 0.1 | — | A | 15 | 15 | 15 | — |
| Example 24 | 21.7 | BP | 30 | — | — | — | A | 60 | 60 | 60 | — |
| Example 25 | 21.7 | BTA | 40 | — | — | — | A | 60 | 60 | 60 | — |
| Comparison 1 | 21.7 | — | — | — | — | — | A | 85 | 85 | 85 | — |
| Comparison 2 | 39.5 | — | — | — | — | — | A | 85 | 85 | 85 | — |
| Comparison 3 | 59.5 | — | — | — | — | — | A | 80 | 80 | 80 | — |
| Comparison 4 | 71.6 | — | — | — | — | — | A | 50 | 40 | 40 | — |
| Comparison 5 | 79.7 | — | — | — | — | — | A | 20 | 20 | 20 | — |
| Comparison 6 | 71.6 | — | — | — | — | — | A | — | — | — | 5 |

Table 1 shows the kinds of the color pigment of the ink, the additives and the used activating agent in Examples 1 through 25 and Comparisons 1 through 6 according to the first form and the evaluation (glossiness=gross value) of the decoration layer obtained in these Examples and Comparisons. These Examples and Comparisons were carried out by the water pressure transfer method according to the two-stage irradiation system shown in FIGS. 2 and 6 except that the conditions of Table 1 changed. Concretely, after applying the activating agent on the print pattern of the transfer film by the wire bar coating method just before introducing the transfer film into the transfer tub, the transfer film having the activating agent applied was floated on the water surface of the transfer tub to thereby reproduce the adhesion of the print pattern by the activating agent and after forcing an article underwater via the the A type metal halide lamp (MAN 800NL manufactured by GS YUASA POWER SUPPLY). The pattern-transferred article was a flat board of ABS resin (TM20 of manufactured by UAMG/ABS CO., Ltd. and having the sizes of 100 mm×200 mm and the thickness of 3 mm)

Comparisons 1 through 6 have no ultraviolet ray permeability lowering agent such as ultraviolet ray absorbent or ultraviolet ray shielding agent and no constitution pigments used for ink and have the concentration of the ink pigments changed as in Table 1, respectively.

The Evaluation (gross value) of Table 1 is shown by the value (gloss degree) obtained by measuring the surface of the decoration layer for every color using the gloss meter, Gloss Meter Model GP-60 manufactured by TOKYO DENSHOKU CO., LTD. in accordance with the measuring method of Japanese Industrial Standards Z8741-1997 "method 3-60-degree specular surface gloss" conformity.

The following will be noted from the amount of addition of the pigments to the ink, the kind and the amount of addition of the additives to the ink and the evaluation in Table I.

(a) With the same concentration of the color pigments in any ink of yellow, blue and red, (which will be applied to the concentration of the same degree), the more the amount of addition of the ultraviolet ray absorber (UVA) and the ultraviolet ray shielding agent are, the gross value was more lowered and there could be obtained the decoration layer having the glossiness as low as the decoration layer of black ink having no ultraviolet ray permeability lowering agent in Comparison 6. This means that there could be adjusted the gloss of the ink printed portions of not only the black ink but also the inks of light color such as yellow, blue and red for the color printing in accordance with the ratio of blend of the ultraviolet ray absorbent (UVA) and the ultraviolet ray shielding agent in the ink (see Examples 1 through 5 and Examples 6 through 11)

(b) The ultraviolet ray absorbent of benzotriazole or phenyltriazole had the matting effect lower than that of benzophenone whereby the glossiness became higher (compare Example 3 with Examples 6 and 7).

(c) It will be noted that the ultraviolet ray shielding agent of rutile type titanium dioxide particulates (Examples 8 through 11) had the matting effect (glossy lowering) larger than the one of anatase type titanium oxide particulates (Example 12) or of zinc oxide particulates (Example 13). It will be also noted that the rutile type titanium dioxide particulates of larger ratio of the short axis relative to the long axis (ideally of shape closer to the sphere) had the larger matting effect (glossy lowering) (Examples 9 and 11).

(d) Even if both of the ultraviolet ray absorbent and the ultraviolet ray shielding agent were used, there could be obtained the same matting effect as the case of the single and even if the quantity of the ultraviolet ray shielding agent might decreases on the combined use of the ultraviolet ray absorbent and the ultraviolet ray shielding agent, there could be obtained the equivalent matting effect. Therefore, in case the expensive titanium oxide of nanometer region for the ultraviolet ray shielding agent is used, it will be more advantageous regarding cost (see Examples 14 through 18).

(e) Since with the constitution pigments added, the matting effect is somewhat cancelled, the glossiness can be adjusted. Since the constitution pigments are cheaper than the ultraviolet ray permeability lowering agent, with the constitution pigments used in order to decrease the quantity of the ultraviolet ray permeability lowering agent, there can be inexpensively provided the ink which can have the equivalent matting effect (Examples 17 and 18).

(f) With the matting agent added to the activating agent (ultraviolet ray hardening resin composite), the matting effect is somewhat cancelled in the same manner as in (d) and therefore, the glossiness can be adjusted (see Examples 19 through 21).

(g) Comparisons 1 through 3 show to what extent the gloss value can change by changing the concentration of the coloring pigments of the ink. It will be noted that if the ultraviolet ray permeability lowering agent or its adjustment agent (constitution pigments), which are used in Examples 1 through 21 are not at all used, the change in the gloss value will be smaller, then the gloss value of the printed portions of primary color (yellow, red and blue) of the foundation of the color printing cannot be reduced in the water pressure transfer method for forming the decoration layer having the ink printed portions of predetermined gloss by ultraviolet-hardening of the integrated layer where the ink of the print pattern and the ultraviolet ray hardening resin composite in the activating agent were intermingled with each other.

(h) Since with the concentration of the color pigments in the black ink reduced, the ultraviolet ray permeability will become higher, the gloss value can be adjusted by adding the ultraviolet ray permeability lowering agent and the design can be expressed in a larger range by adjusting the shade and the gloss of the black (Example 22).

(i) It will be noted that in case where the ultraviolet ray absorbent is the benzophenone based one, as the blend ratio of the absorbent occupied in the ink is within the range of 0.1 to 30 weight %, much more desirable matting effect can be obtained. In obtaining the same matting effect, it will be noted that in case where the ultraviolet ray absorbent is the benzotriazine based one, the better matting effect was obtained without any occurrence of faults such as bleed with the upper limit of 40 weight %. Furthermore, it will be noted that by making 0.1 to 30 weight % the ratio of the ultraviolet ray shielding agent occupied in the ink, the much better preferred matting effect can be obtained (Examples 1 to 25).

Examples 26 to 61 of Second Form

Examples 26 to 61 of second form show the results of evaluation obtained by arranging adjacent to each other the layers I and II of two kinds of ink having the different blend ratio of the ultraviolet ray permeability lowering agent to obtain the high and low gloss pattern parts and the gloss difference (the difference of gloss) while the ink color and the blend ratio change. In the inks I and II of the Examples 26-61 of this second form, the first figure indicates the number of Example 1 of Table 1, the next English letter indicates the initial of the colors. For example, "1-Y" indicates that the same yellow ink as the yellow ink of Example 1 is used, "3-B" indicates that the same blue ink as the blue ink of Example 3 is used, "8-R" indicates that the same red ink as the red ink of Example 8 is used and they may be applicable to the other indications. The content of the additives in the ink in Table 2 is the same as Table 1, namely, the amount of addition of (a) the ultraviolet ray absorbent (UVA) and (b) the ultraviolet ray shielding agent is the numeral of weight %, the ratio where they are occupied in the ink and the amount of addition of (c) the constitution pigments is the ratio (weight part) of the constitution pigments relative to 100 weight parts the ingredient (solid ingredient when dried) other than the ultraviolet ray permeability lowering agent in the ink. Furthermore, the activating agent, the transfer film and the conditions of two-step irradiation of the ultraviolet ray are the same as the Examples of first form. Table 2A shows composition of the ink containing the additives of Examples 26 through 61 and Table 2B shows gloss evaluation of Examples 26 through 61 of Table 2A.

TABLE 2A

| | Pattern form | | Amount of inclusion of additives in ink | | | | | | |
|---|---|---|---|---|---|---|---|---|---|
| | | | Ink (I) | | | Ink (II) | | | |
| | | | (a) UV ray absorbent [weight %] | (b) UV ray shielding agent [weight %] | (c) Constitution pigment [weight part] | (a) UV ray absorbent [weight %] | (b) UV ray shielding agent [weight %] | (c) Constitution pigment [weight part] | Activating agent |
| | Ink (I) | Ink (II) | | | | | | | |
| Example 26 | 1-Y | 3-Y | 2.9 | — | — | 10.6 | — | — | A |
| Example 27 | 1-B | 3-B | 2.9 | — | — | 10.6 | — | — | A |
| Example 28 | 1-R | 3-R | 2.9 | — | — | 10.6 | — | — | A |
| Example 29 | 8-Y | 10-Y | — | 5.6 | — | — | 17.7 | — | A |
| Example 30 | 8-B | 10-B | — | 5.6 | — | — | 17.7 | — | A |
| Example 31 | 8-R | 10-R | — | 5.6 | — | — | 17.7 | — | A |
| Example 32 | 1-Y | 10-Y | 2.9 | — | — | — | 17.7 | — | A |
| Example 33 | 1-B | 10-B | 2.9 | — | — | — | 17.7 | — | A |
| Example 34 | 1-R | 10-R | 2.9 | — | — | — | 17.7 | — | A |
| Example 35 | 4-Y | 14-Y | 3.8 | — | — | 5.6 | 5.6 | — | A |
| Example 36 | 4-B | 14-B | 3.8 | — | — | 5.6 | 5.6 | — | A |
| Example 37 | 4-R | 14-R | 3.8 | — | — | 5.6 | 5.6 | — | A |
| Example 38 | 17-Y | 14-Y | 2.9 | 2.9 | 23.8 | 5.6 | 5.6 | — | A |
| Example 39 | 17-B | 14-B | 2.9 | 2.9 | 23.8 | 5.6 | 5.6 | — | A |
| Example 40 | 17-R | 14-R | 2.9 | 2.9 | 23.8 | 5.6 | 5.6 | — | A |
| Example 41 | 1-Y | 3-Y | 2.9 | — | — | 10.6 | — | — | B |
| Example 42 | 1-B | 3-B | 2.9 | — | — | 10.6 | — | — | B |
| Example 43 | 1-R | 3-R | 2.9 | — | — | 10.6 | — | — | B |
| Example 44 | 1-Y | 3-B | 2.9 | — | — | 10.6 | — | — | A |
| Example 45 | 1-Y | 3-R | 2.9 | — | — | 10.6 | — | — | A |
| Example 46 | 1-R | 3-B | 2.9 | — | — | 10.6 | — | — | A |
| Example 47 | 8-B | 10-Y | — | 5.6 | — | — | 17.7 | — | A |
| Example 48 | 8-B | 10-R | — | 5.6 | — | — | 17.7 | — | A |
| Example 49 | 8-Y | 10-B | — | 5.6 | — | — | 17.7 | — | A |
| Example 50 | 1-Y | 10-B | 2.9 | — | — | — | 17.7 | — | A |
| Example 51 | 1-Y | 10-R | 2.9 | — | — | — | 17.7 | — | A |
| Example 52 | 1-R | 10-Y | 2.9 | — | — | — | 17.7 | — | A |
| Example 53 | 4-R | 14-Y | 3.8 | — | — | 5.6 | 5.6 | — | A |
| Example 54 | 4-R | 14-B | 3.8 | — | — | 5.6 | 5.6 | — | A |
| Example 55 | 4-B | 14-R | 3.8 | — | — | 5.6 | 5.6 | — | A |
| Example 56 | 17-Y | 10-B | 2.9 | 2.9 | 23.8 | — | 17.7 | — | A |
| Example 57 | 17-B | 10-R | 2.9 | 2.9 | 23.8 | — | 17.7 | — | A |
| Example 58 | 17-R | 10-Y | 2.9 | 2.9 | 23.8 | — | 17.7 | — | A |
| Example 59 | 4-R | 14-Y | 3.8 | — | — | 5.6 | 5.6 | — | B |
| Example 60 | 4-R | 14-B | 3.8 | — | — | 5.6 | 5.6 | — | B |
| Example 61 | 4-B | 14-R | 3.8 | — | — | 5.6 | 5.6 | — | B |

TABLE 2B

| | Evaluiation of gloss | | | | |
|---|---|---|---|---|---|
| | High gloss part | | Low gloss part | | |
| | Pattern | Value of gloss | Pattern | Value of gloss | Difference of gloss |
| Example 26 | 1-Y | 70 | 3-Y | 20 | 50 |
| Example 27 | 1-B | 70 | 3-B | 30 | 40 |
| Example 28 | 1-R | 70 | 3-R | 30 | 40 |
| Example 29 | 8-Y | 15 | 10-Y | 5 | 10 |
| Example 30 | 8-B | 15 | 10-B | 5 | 10 |
| Example 31 | 8-R | 15 | 10-R | 5 | 10 |
| Example 32 | 1-Y | 70 | 10-Y | 5 | 65 |
| Example 33 | 1-B | 70 | 10-B | 5 | 65 |
| Example 34 | 1-R | 70 | 10-R | 5 | 65 |
| Example 35 | 4-Y | 80 | 16-Y | 5 | 75 |
| Example 36 | 4-B | 80 | 16-B | 5 | 75 |
| Example 37 | 4-R | 80 | 16-R | 5 | 75 |
| Example 38 | 17-Y | 30 | 16-Y | 5 | 25 |
| Example 39 | 17-B | 30 | 16-B | 5 | 25 |
| Example 40 | 17-R | 30 | 16-R | 5 | 25 |
| Example 41 | 1-Y | 40 | 3-Y | 10 | 30 |
| Example 42 | 1-B | 40 | 3-B | 10 | 30 |
| Example 43 | 1-R | 40 | 3-R | 10 | 30 |
| Example 44 | 1-Y | 70 | 3-B | 20 | 50 |
| Example 45 | 1-Y | 70 | 3-R | 30 | 40 |
| Example 46 | 1-R | 70 | 3-B | 30 | 40 |
| Example 47 | 8-B | 15 | 10-Y | 5 | 10 |
| Example 48 | 8-B | 15 | 10-R | 5 | 10 |
| Example 49 | 8-Y | 15 | 10-B | 5 | 10 |
| Example 50 | 1-Y | 70 | 10-B | 5 | 65 |
| Example 51 | 1-Y | 70 | 10-R | 5 | 65 |
| Example 52 | 1-R | 70 | 10-Y | 5 | 65 |
| Example 53 | 4-R | 80 | 14-Y | 10 | 70 |
| Example 54 | 4-R | 80 | 14-B | 10 | 70 |
| Example 55 | 4-B | 80 | 14-R | 10 | 70 |
| Example 56 | 17-Y | 30 | 10-B | 5 | 25 |
| Example 57 | 17-B | 30 | 10-R | 5 | 25 |
| Example 58 | 17-R | 30 | 10-Y | 5 | 25 |
| Example 59 | 4-R | 40 | 14-Y | 5 | 35 |
| Example 60 | 4-R | 40 | 14-B | 5 | 35 |
| Example 61 | 4-B | 40 | 14-R | 5 | 35 |

As shown in Tables 2A and 2B, Examples 26 through 43 show the cases where the high and low gloss pattern parts of the ink layer of the same color (expressed by only as "high and low gloss parts in the Tables) were adjacent to each other and Examples 44 through 46 show the cases where the high and low gloss pattern parts of two-color ink layer were adjacent to each other. Examples 26 through 28 and Examples 44 through 46 show the cases where only the ultraviolet ray absorbent (UVA) was blended, Examples 29 through 31 and Examples 47 through 49 show the cases where only the ultraviolet ray shielding agent was blended, Examples 32 through 34 and Examples 50 through 52 show the cases where the ultraviolet ray absorbent was blended with one I of the inks and the ultraviolet ray shielding agent was blended with another ink II, Examples 35 through 37 and Examples 53 through 55 show the cases where only the ultraviolet ray absorbent was blended with the one ink I and the ultraviolet ray absorbent and the ultraviolet ray shielding agent were blended with the other ink II, Examples 38 through 40 and Examples 56 through 58 show the cases where the ultraviolet ray absorbent, the ultraviolet ray shielding agent and the constitution pigments were blended with the one ink and the ultraviolet ray absorbent and the ultraviolet ray shielding agent were blended with the other ink II and finally Examples 41 through 43 and Examples 59 through 61 show the cases where the ultraviolet ray absorbent was blended with the ink and the matting activating agent was used in order to activate the transfer film.

In Examples of second form shown in the Table 2, the gloss of each of the ink printed portions was adjusted in accordance with the amount of addition of the ultraviolet ray absorbent and the ultraviolet ray shielding agent in each of the ink printed portions by forming the different ink printed portions adjacent to each other by changing the kind and the amount of blend of additive agents (the ultraviolet ray permeability lowering agent and the constitution pigments) with the result that the adjacent ink printed portions had the gloss difference imparted thereto. The effects regarding these glossiness are the sane effects as the effects (a) through (h) regarding the glossiness (gloss value) of Examples of first form and it will be noted from the ratio of blend of the ultraviolet ray permeability lowering agent of the second ink and the evaluation thereof that the following effects (a) through (e) are provided.

(a) By making different the amount of addition of the ultraviolet ray absorbent or the ultraviolet ray shielding agent in each of the adjacent ink printed portions of the same color of any of yellow, blue and red, there can be formed the adjacent patterns of the same color and of the different gloss wherein the ink printed portions having the more amount of blend had the lower gloss (the larger matting effect) and the ink printed portions having the less amount of blend had the higher gloss (the smaller matting effect)

Examples 26 Through 28 and 29 Through 31

(b) It can be noted that there can be formed the adjacent patterns of the same color and of the different gloss in any of the case where the ultraviolet ray absorbent was added to the ink of one of the adjacent ink printed portions and the ultraviolet ray shielding agent was added with the ink of the other of the adjacent ink printed portions to thereby make the degree of gloss of the respective ink printed portions different (Examples 32 through 34), the case where the ultraviolet ray absorbent was added with the ink of one of the adjacent ink printed portions and the ultraviolet ray absorbent and the ultraviolet ray shielding agent were added with the ink of the other ink printed portion to thereby make the degree of gloss of the respective ink printed portions different (Examples 35 through 37) and the case where both of the ultraviolet ray absorbent and the ultraviolet ray shielding agent were added with the ink of both of the ink printed portion with the different amount of addition or with the constitution pigments added to thereby make the degree of gloss of the respective ink printed portions different (Examples 38 through 40).

(c) It will be noted that in any of the above cases of (b), the more amount of addition of the ultraviolet ray permeability lowering agent (the total amount of addition in the case where the ultraviolet ray absorbent and the ultraviolet ray shielding agent were combined) resulted in the lower gloss (the larger matting effect) and the less amount of addition resulted in the higher gloss (the smaller matting effect).

(d) By selectively combining the kinds of the ultraviolet ray permeability lowering agent or by changing the amount of addition thereof in any case where the adjacent ink printed portions had the different colors like (a) through (c), the gloss degree of the adjacent patterns could be changed and therefore, it will be noted that the design expression with various colors and glosses combined can be obtained.

(e) With the matting activating agent used in order to blend the ultraviolet ray absorbent with the ink and also to activate the transfer film, the gloss difference could be adjusted so as to get smaller like the case where the constitution pigments are used (Examples 41 through 43 and Examples 59 through 61).

Examples 62 Through 68 and Examples 90 Through 107 of Third Form

Although in the Examples of first and second forms were set constant the peak intensity and the integral of light of the ultraviolet ray of the preliminary irradiation and the peak intensity and the integral of light of the ultraviolet ray of the original irradiation, in the Examples of 62 through 89 and Examples 90 through 107 of third form were variously changed the peak intensity and the integral of light of the ultraviolet ray of the preliminary and original irradiations as shown in the following Tables 3A and 3B and Tables 4A and 4B where the result of evaluation of the matting effect (the glossy reduction) of the ink layer using the ink of Examples 3, 9 and 14 is shown.

TABLE 3A

| | Condition of Preliminary irradiation | | Condition of Original Irradiation | |
|---|---|---|---|---|
| | Integral of light (E) mJ/cm$^2$ | Peak intensity (Ip) mW/cm$^2$ | Integral of light (E$_1$) mJ/cm$^2$ | Peak intensity (Ip$_1$) mW/cm$^2$ |
| Example 62 | 100 | 1 | 2300 | 300 |
| Example 63 | 75 | 1.64 | 2300 | 300 |
| Example 64 | 45 | 4.8 | 2300 | 300 |
| Example 65 | 25 | 2 | 2300 | 300 |
| Example 66 | 60 | 2 | 2300 | 300 |
| Example 67 | 15 | 4 | 2300 | 300 |
| Example 68 | 90 | 0.7 | 2300 | 300 |
| Example 69 | 11 | 5.5 | 2300 | 300 |
| Example 70 | 35 | 5.5 | 2300 | 300 |
| Example 71 | 25 | 5.1 | 2300 | 300 |
| Example 72 | 119 | 0.6 | 2300 | 300 |
| Example 73 | 6 | 5.84 | 2300 | 300 |
| Example 74 | 9 | 3.45 | 2300 | 300 |
| Example 75 | 16 | 1.63 | 2300 | 300 |
| Example 76 | 29 | 0.75 | 2300 | 300 |
| Example 77 | 125 | 0.6 | 2300 | 300 |
| Example 78 | 35 | 7.93 | 2300 | 300 |

TABLE 3A-continued

| | Condition of Preliminary irradiation | | Condition of Original Irradiation | |
|---|---|---|---|---|
| | Integral of light (E) mJ/cm$^2$ | Peak intensity (Ip) mW/cm$^2$ | Integral of light (E$_1$) mJ/cm$^2$ | Peak intensity (Ip$_1$) mW/cm$^2$ |
| Example 79 | 25 | 12.8 | 2300 | 300 |
| Example 80 | 10 | 10 | 2300 | 300 |
| Example 81 | 25 | 8.22 | 2300 | 300 |
| Example 82 | 3 | 12 | 2300 | 300 |
| Example 83 | 60 | 0.29 | 2300 | 300 |
| Example 84 | 125 | 0.11 | 2300 | 300 |
| Example 85 | 15 | 28 | 2300 | 300 |
| Example 86 | 25 | 5.1 | 1000 | 200 |
| Example 87 | 25 | 5.1 | 4000 | 200 |
| Example 88 | 25 | 5.1 | 1000 | 400 |
| Example 89 | 25 | 5.1 | 4000 | 400 |

TABLE 3B

| | Matting Effect | | | | | |
|---|---|---|---|---|---|---|
| | Example 3 Ink | | Example 9 Ink | | Example 14 Ink | |
| | Board | Cube | Board | Cube | Board | Cube |
| Example 62 | ◎ | ○ | ◎ | ○ | ◎ | ○ |
| Example 63 | ◎ | ◎ | ◎ | ◎ | ◎ | ◎ |
| Example 64 | ◎ | ◎ | ◎ | ◎ | ◎ | ◎ |
| Example 65 | ◎ | ◎ | ◎ | ◎ | ◎ | ◎ |
| Example 66 | ◎ | ◎ | ◎ | ◎ | ◎ | ◎ |
| Example 67 | ◎ | ◎ | ◎ | ◎ | ◎ | ◎ |
| Example 68 | ◎ | ◎ | ◎ | ◎ | ◎ | ◎ |
| Example 69 | ◎ | ◎ | ◎ | ◎ | ◎ | ◎ |
| Example 70 | ◎ | ◎ | ◎ | ◎ | ◎ | ◎ |
| Example 71 | ◎ | ◎ | ◎ | ◎ | ◎ | ◎ |
| Example 72 | ◎ | ◎ | ◎ | ◎ | ◎ | ◎ |
| Example 73 | ◎ | ◎ | ◎ | ◎ | ◎ | ◎ |
| Example 74 | ◎ | ◎ | ◎ | ◎ | ◎ | ◎ |
| Example 75 | ◎ | ◎ | ◎ | ◎ | ◎ | ◎ |
| Example 76 | ◎ | ◎ | ◎ | ◎ | ◎ | ◎ |
| Example 77 | ○ | ○ | ○ | ○ | ○ | ○ |
| Example 78 | ○ | Δ | ○ | Δ | ○ | Δ |
| Example 79 | ○ | Δ | ○ | Δ | ○ | Δ |
| Example 80 | ○ | Δ | ○ | Δ | ○ | Δ |
| Example 81 | ○ | ○ | ○ | ○ | ○ | ○ |
| Example 82 | ○ | Δ | ○ | Δ | ○ | Δ |
| Example 83 | ○ | Δ | ○ | Δ | ○ | Δ |
| Example 84 | ○ | Δ | ○ | Δ | ○ | Δ |
| Example 85 | ○ | Δ | ○ | Δ | ○ | Δ |
| Example 86 | ◎ | ◎ | ◎ | ◎ | ◎ | ◎ |
| Example 87 | ◎ | ◎ | ◎ | ◎ | ◎ | ◎ |
| Example 88 | ◎ | ◎ | ◎ | ◎ | ◎ | ◎ |
| Example 89 | ◎ | ◎ | ◎ | ◎ | ◎ | ◎ |

TABLE 4A

| | Condition of preliminary irradiation | | Condition of original iradiation | |
|---|---|---|---|---|
| | Integral of light (E) mJ/cm$^2$ | Peak intensity (Ip) mW/cm$^2$ | Integral of light (E) mJ/cm$^2$ | Peak intensity (Ip$_1$) mW/cm$^2$ |
| Example 90 | 32 | 12 | 2300 | 300 |
| Example 91 | 6 | 2 | 2300 | 300 |
| Example 92 | 3.88 | 0.4 | 2300 | 300 |
| Example 93 | 43 | 7 | 2300 | 300 |
| Example 94 | 100 | 10 | 2300 | 300 |
| Example 95 | 75 | 3 | 2300 | 300 |
| Example 96 | 125 | 2.5 | 2300 | 300 |
| Example 97 | 40 | 9 | 2300 | 300 |
| Example 98 | 60 | 4 | 2300 | 300 |
| Example 99 | 35 | 14 | 2300 | 300 |
| Example 100 | 100 | 2 | 2300 | 300 |
| Example 101 | 12 | 0.9 | 2300 | 300 |
| Example 102 | 3 | 4 | 2300 | 300 |
| Example 103 | 40 | 0.1 | 2300 | 300 |
| Example 104 | 2 | 9 | 2300 | 300 |
| Example 105 | 23 | 0.2 | 2300 | 300 |
| Example 106 | 25 | 5.1 | 500 | 100 |
| Example 107 | 25 | 5.1 | 6000 | 500 |

TABLE 4B

| | Matting effect | | | | | |
|---|---|---|---|---|---|---|
| | Example 2 Ink | | Example 9 Ink | | Example 14 Ink | |
| | Board | Cube | Board | Cube | Board | Cube |
| Example 90 | ΔΔ | ΔΔ | ΔΔ | ΔΔ | ΔΔ | ΔΔ |
| Example 91 | ΔΔ | ΔΔ | ΔΔ | ΔΔ | ΔΔ | ΔΔ |
| Example 92 | ΔΔ | ΔΔ | ΔΔ | ΔΔ | ΔΔ | ΔΔ |
| Example 93 | ΔΔ | ΔΔ | ΔΔ | ΔΔ | ΔΔ | ΔΔ |
| Example 94 | ΔΔ | ΔΔ | ΔΔ | ΔΔ | ΔΔ | ΔΔ |
| Example 95 | ΔΔ | ΔΔ | ΔΔ | ΔΔ | ΔΔ | ΔΔ |
| Example 96 | ΔΔ | ΔΔ | ΔΔ | ΔΔ | ΔΔ | ΔΔ |
| Example 97 | ΔΔ | ΔΔ | ΔΔ | ΔΔ | ΔΔ | ΔΔ |
| Example 98 | ΔΔ | ΔΔ | ΔΔ | ΔΔ | ΔΔ | ΔΔ |
| Example 99 | ΔΔ | ΔΔ | ΔΔ | ΔΔ | ΔΔ | ΔΔ |
| Example 100 | ΔΔ | ΔΔ | ΔΔ | ΔΔ | ΔΔ | ΔΔ |
| Example 101 | ΔΔ | ΔΔ | ΔΔ | ΔΔ | ΔΔ | ΔΔ |
| Example 102 | ΔΔ | ΔΔ | ΔΔ | ΔΔ | ΔΔ | ΔΔ |
| Example 103 | ΔΔ | ΔΔ | ΔΔ | ΔΔ | ΔΔ | ΔΔ |
| Example 104 | ΔΔ | ΔΔ | ΔΔ | ΔΔ | ΔΔ | ΔΔ |
| Example 105 | ΔΔ | ΔΔ | ΔΔ | ΔΔ | ΔΔ | ΔΔ |
| Example 106 | ΔΔ(There are partial semi-hardened portions) | | | | | |
| Example 107 | ΔΔ | ΔΔ | ΔΔ | ΔΔ | ΔΔ | ΔΔ |

In the matting effect of Tables 3B and 4B, the symbol "◎" (double circle) of the board article (referred to as "board" in Tables) indicates that the average of the gloss value (referred to as "gross average value" hereinafter) of yellow, blue and red ink layers is less than 20, the symbol "○" (single circle) indicates that the gloss average value is 20 or more and less than 50, the symbol "Δ" (triangle) indicates that the gloss average value is 50 or more and less than 75 and the symbol "ΔΔ" (two triangle) indicates that the gloss average value is 75 or more. The symbol "◎" (double circle) of the cubic article (referred to as cube in Tables) indicates that the difference between the maximum and minimum values (referred to as the gloss range hereinafter) of each of the faces of the cubic articles is less than 5, the symbol "○" (single circle) indicates that the gloss range is 5 or more and less than 10, the symbol "Δ" (triangle) indicates that the gloss range is 10 or more and less than 20 and the symbol "ΔΔ" (two triangles) indicates that the gloss range is 20 or more. In other words, the symbol "◎" (double circle) shows the state where the good matting effect (the glossy reduction) appears on the decoration layer, the symbol "○" (single circle) shows the state where the matting effect appears on the decoration layer, the symbol "Δ" (triangle) shows the state where there appears the matting effect having no problem in practice although it is inferior to the effect of the symbol "○" and the symbol "ΔΔ" (two triangle) shows the state where the matting effect of the decoration layer is smaller (the state where the matting appears with the poor additional value of design). The aforementioned gross value is the value obtained by measurement using "Gloss Meter Model GP-60", the gloss meter manufactured by TOKYO DENSHOKU CO., LTD. in accordance with the measurement method of Japanese Industrial Standards Z8741-1997 "method 3-60-degree specular surface gloss".

Example 62

In Example 62 according to third form of embodiment, in the same manner as the Examples according to first form of embodiment were carried out the water pressure transfer method according to the two-step irradiation system on the pattern-transferred article in the form of board article and cubic article to obtain the water pressure transfer article (product). The ultraviolet ray irradiation was carried out so that after the ultraviolet ray was preliminarily irradiated using the high-pressure-mercury lamp (high pressure mercury lamp HAK125NL-F manufactured by GS YUASA POWER SUPPLY COMPANY) with the peak intensity of 0.75 [mW/cm$^2$] and integral of light of 125 [mJ/cm$^2$], the ultraviolet ray was originally irradiated on the decoration layer using the A type metal halide lamp (MAN800NL manufactured by GS YUASA POWER SUPPLY COMPANY) with the peak intensity of 300 [mW/cm$^2$] and integral of light of 2300 [mJ/cm$^2$]. Naturally, the lamps for the preliminary irradiation and for the original irradiation irradiated the ultraviolet ray on the side face and the upper surface of the article in the fixed state, respectively. The pattern-transferred articles used were the board of ABS resin (TM20 manufactured by UMG-ABS CO., Ltd.) having the size of 100 mm×200 mm×thickness of 3 mm and the cubic article of material identical to that of the board (the approximately rectangular parallelepiped mold of 100 mm×100 mm×thickness of 50 mm).

Examples 63 Through 85

The same original irradiation as that of Example 59 was performed except that the preliminary irradiation conditions (peak intensity and integral of light) changed as shown in Table 3A.

Examples 86 Through 89

The same preliminary irradiation as that of Example 68 was performed except that the original irradiation conditions (peak intensity and integral of light) of Example 68 changed as shown in Table 3A.

Examples 90 Through 105

The same original irradiation as that of Example 1 was performed except that the preliminary irradiation conditions (peak intensity and integral of light) changed as shown in Table 4A.

Examples 106 Through 107

The same preliminary irradiation as that of Example 71 was performed except that the original irradiation conditions (peak intensity and integral of light) changed as shown in Table 4A.

Evaluation of Examples 62 Through 89 and Examples 90 Through 107

The evaluation results (matting effect) of Examples 62 through 89 and Examples 90 through 107 are as shown in Tables 3B and 4B and it will be noted from the evaluation results that the matting effects of Examples 62 through 89 were most preferable, better or practically had no problem, but the matting effects of Examples 90 through 107 were relatively smaller.

Figure 8:
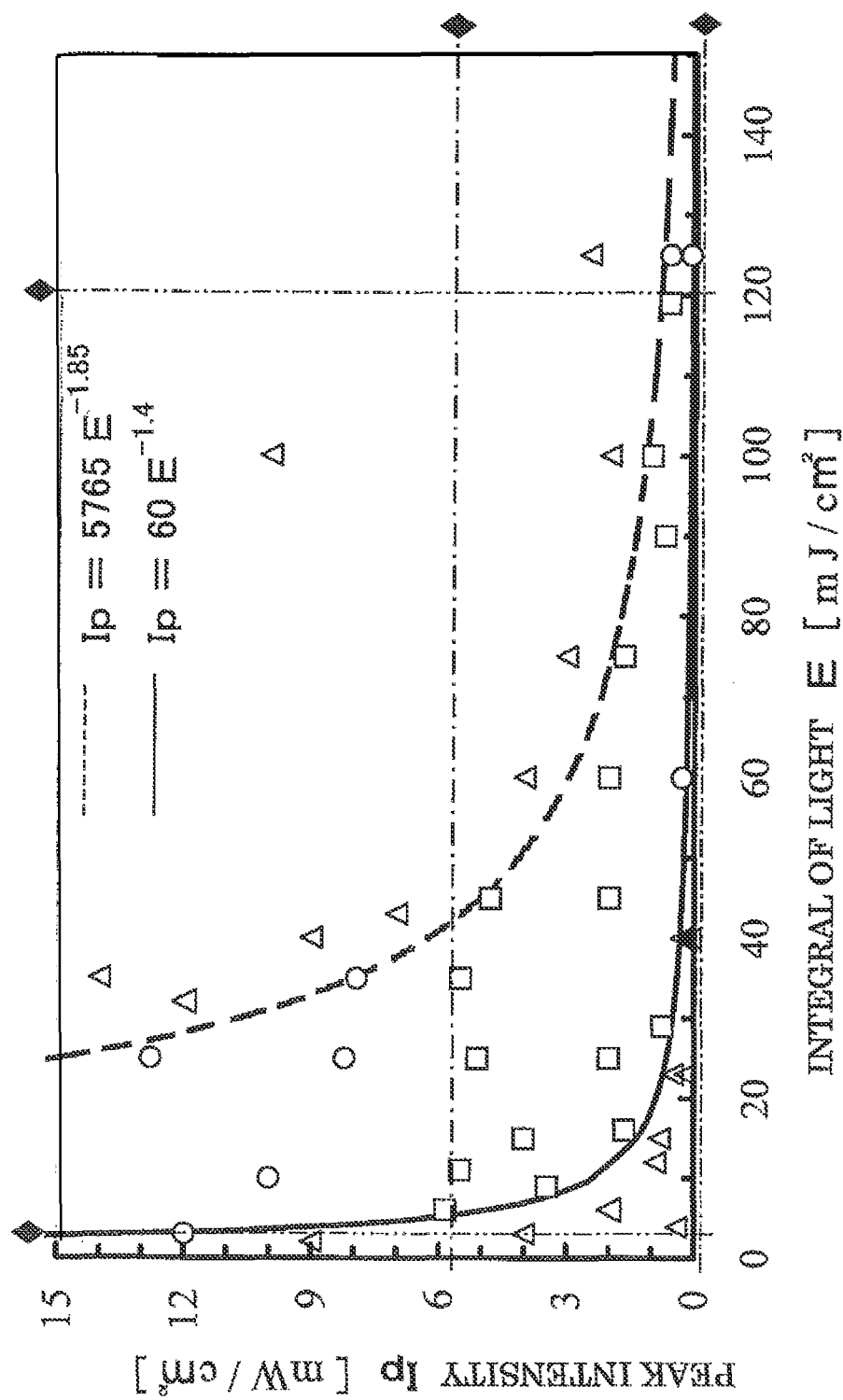
FIG. 8 is a graph showing an evaluation result of the preliminary irradiation conditions and the matting effect in Examples according to the third form of embodiment and Comparisons.

What schematically illustrates the preliminary irradiation conditions of the aforementioned Examples 62 through 89 and Examples 90 through 107 is shown in FIG. 8. In FIG. 8, the symbols "□" show the dot position of the irradiation conditions of Examples 62 through 76, the symbols "○" show the dot position of the irradiation conditions of Examples 74 through 81 and the symbols "Δ" show the dot position of the irradiation conditions of Examples 90 through 105. As noted from FIG. 8, the condition area of respective Examples where the matting effect of the purpose of the invention is obtained exists within the preliminary irradiation condition of the invention. The desirable matting effect was obtained within the range of $60E^{1.4} \leq Ip \leq 5765E^{-1.85}$, the area positioned between the boundary condition curves (I) and (II) expressed by the formulate shown in FIG. 8 and particularly, the better matting effect can be obtained in the conditions satisfying that the peak intensity (Ip) is 0.5 [mW/cm$^2$] or more and 6 [mW/cm$^2$] or less and integral of light (E) is 5 [mJ/cm$^2$] or more and 120 [mJ/cm$^2$] or less. If the conditions are deviated from the range, then the matting effect will be lower and in the case where the article is the cubic one, as described in the Background of Technology, there have occurred such a fault that the desired matting effect could not be obtained on the side of the article.

Although not illustrated in Tables 3A and 3B and Tables 4A and 4B, if the original irradiation conditions are within the range of the original irradiation conditions of the invention as in Examples 62 through 89, there will occur no faults such as poor hardening of the coat film, but if they are deviated from the range of the original irradiation conditions of the invention as in Examples 106 and 107, then there sometimes occurs the fault of poor hardening or the high gloss, which causes the matting effect to be extremely lower and therefore it will be noted that the irradiation conditions should be effectively appropriated.

In Examples 62 through 89, in general, the degree of gloss of the low gloss pattern part is less than 20, the glossy difference between the high gloss pattern part and the low gloss pattern part is 10 or more and the value of gloss degree and the value of the glossy difference are the glossy degree preferable for the design. Therefore. In these Examples, by adjusting the preliminary irradiation conditions and the original irradiation conditions within the predetermined range while realizing the desirable glossy degree, the matting effect of design on the desired portions or on all the surfaces can be controlled.

On the other hand, in Examples 90 through 107 of Table 3B, in general, the glossy degree of the low gloss pattern part and the difference of the gloss degree between the high gloss pattern part and the low gloss pattern part are deviated from the aforementioned preferred range and it will be noted from this that the ultraviolet ray irradiation should be effectively appropriated in order to obtain the desirable appearance on the design together with the fact that the matting effect will be reduced by deviating the preliminary and original irradiation conditions from those of the invention.

INDUSTRIAL APPLICABILITY

According to the invention, there can be imparted the adjustment of gloss and the gloss variation not only for the decoration layer mainly of dark color such as black ink as in the case where there changes the amount of hardening shrinkage of the ink having the ultraviolet ray hardening resin composite of the activating agent intermingled on the oil absorption and the concentration of ink, but also for the decoration layer of light color other than the one mainly having the black and therefore there can be applicable to the decoration layer of the color of wider range.

EXPLANATION OF REFERENCE NUMERAL 10 article
20 transfer film
30 water-soluble film
40 print pattern
44 decoration layer
44C surface hardened layer
44 GH high gloss pattern part
44GL low gloss pattern part
44I ink printed portion
46 ultraviolet ray hardening resin composite intermingled print pattern. (integral layer)
50 water
60 activating agent
62 ultraviolet ray hardening resin composite
70 ultraviolet ray
70L low permeability ultraviolet ray
70H High permeability ultraviolet ray

The invention claimed is:

1. A water pressure transfer method comprising the steps of applying an activating agent comprising an ultraviolet ray hardening resin composite containing a photo-polymerization monomer, a photo-polymerization oligomer and a photo-polymerization initiator on a print pattern of a water pressure transfer film having said print pattern dried thereon to thereby recover an adhesion of said print pattern by an activating component of said ultraviolet ray hardening resin composite whereby said print pattern is transferred onto a surface of an article under water pressure and also to thereby permeate said ultraviolet ray hardening resin composite into the whole area of said print pattern whereby an integral layer in which an ink of said print pattern and said ultraviolet ray hardening resin is produced and hardening said ultraviolet ray hardening resin composite within said print pattern of said integral layer by ultraviolet ray to thereby form a decoration layer having an ink printed portion of predetermined gloss, said method characterized in that the gloss of said ink printed portion is adjusted by changing the ultraviolet ray permeability of said ultraviolet ray hardening resin composite permeate into the whole area of said ink printed portion of said decoration layer according to a blend ratio of an ultraviolet ray absorbent and/or an ultraviolet ray shielding agent contained in said ink.

2. A water pressure transfer method comprising the steps of applying an activating agent comprising an ultraviolet ray hardening resin composite containing a photo-polymerization monomer, a photo-polymerization oligomer and a photo-polymerization initiator on a print pattern of a water pressure transfer film having said print pattern dried thereon to thereby recover an adhesion of said print pattern by an activating component of said ultraviolet ray hardening resin composite whereby said print pattern is transferred onto a surface of an article under water pressure and also to thereby permeate said ultraviolet ray hardening resin composite into the whole area of said print pattern whereby an integral layer in which an ink of said print pattern and said ultraviolet ray hardening resin is produced and hardening said ultraviolet ray hardening resin composite within said print pattern of said integral layer by ultraviolet ray to thereby form a decoration layer and imparting to said ink printed portion a gloss variation characteristic having a high gloss pattern part and a low gloss pattern portion adjacent to each other; said method characterized in that said gloss variation characteristic having said high and low gloss pattern parts adjacent to each other is imparted by changing the ultraviolet ray permeability of said ultraviolet ray hardening resin composite according to a blend ratio of an ultraviolet ray absorbent and/or an ultraviolet ray interrupting agent contained in said ink.

3. A water pressure transfer method as set forth in claim 1, and wherein said step of hardening by ultraviolet ray is carried out by two irradiation steps including a step of preliminarily irradiating the ultraviolet ray which is penetrated only into an area near a surface of said print pattern made wet by permeation of said ultraviolet ray hardening resin composite to thereby form a fine surface height variation part by contraction of an ink in a surface of the ink printed portion of said print pattern made wet and a step of thereafter originally irradiating ultraviolet ray which is penetrated through the whole thickness of said decoration layer to thereby completely harden the total thickness of said print pattern made wet while said surface height variation is maintained.

4. A water pressure transfer method as set forth in claim 3 and wherein the ultraviolet ray for said preliminary irradiation is the low permeation ultraviolet ray of 200 nm or more and less than 320 nm and the preliminary irradiation of said ultraviolet ray is preferably carried out under the condition where peak intensity (Ip)[mW/cm$^2$] and integral of light (E) [mJ/cm$^2$]) meet the following formula 1:

$$60E^{-1.4} \leq Ip \leq 5765E^{-1.85} \quad (1)$$

wherein E is >0 and Ip is >0.

5. A water pressure transfer method as set forth in claim 3, and wherein said preliminary irradiation is carried out under the conditions satisfying that the peak intensity (Ip) is 0.5 [mW/cm$^2$] or more and 6 [mW/cm$^2$] or less and integral of light (E) is 5 [mJ/cm$^2$] or more and 120 [mJ/cm$^2$] or less.

6. A water pressure transfer method as set forth in claim 3, and wherein the ultraviolet ray for the original irradiation is the high permeation ultraviolet ray of 320 nm or more and less than 390 nm and the original irradiation of the aforementioned ultraviolet ray is carried out under the conditions satisfying that the peak intensity (Ip1) is 200 [mW/cm$^2$] or more and 400 [mW/cm$^2$] or less and integral of light (E1) is 1000 [mJ/cm$^2$] or more and 4000 [mJ/cm$^2$] or less.

7. A water pressure transfer method as set forth in claim 2, and wherein said ultraviolet ray absorbent is blended within the range of 0.1 to 40 weight % as the ratio where said absorbent is occupied in the ink.

8. A water pressure transfer method as set forth in claim 2, and wherein said ultraviolet ray shielding agent is blended within the range of 0.1 weight % or more as the ratio where said agent is occupied in the ink.

* * * * *

UNITED STATES PATENT AND TRADEMARK OFFICE
CERTIFICATE OF CORRECTION

PATENT NO. : 9,296,253 B2  
APPLICATION NO. : 13/978769  
DATED : March 29, 2016  
INVENTOR(S) : Wataru Ikeda et al.

Page 1 of 1

It is certified that error appears in the above-identified patent and that said Letters Patent is hereby corrected as shown below:

In the claims,

At column 34 line 4, in Claim 2, after "ultraviolet" and before "hardening", please insert --ray--.

Signed and Sealed this
Twenty-first Day of June, 2016

Michelle K. Lee
*Director of the United States Patent and Trademark Office*